US012301777B2

(12) United States Patent
Kimata

(10) Patent No.: US 12,301,777 B2
(45) Date of Patent: May 13, 2025

(54) ELECTRONIC EQUIPMENT, CONTROL METHOD THEREFOR, AND STORAGE MEDIUM

(71) Applicant: CANON KABUSHIKI KAISHA, Tokyo (JP)

(72) Inventor: Kazumasa Kimata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 17/824,500

(22) Filed: May 25, 2022

(65) Prior Publication Data

US 2022/0385877 A1 Dec. 1, 2022

(30) Foreign Application Priority Data

May 31, 2021 (JP) ................................ 2021-091347

(51) Int. Cl.
*H04N 13/167* (2018.01)
*H04N 5/262* (2006.01)
*H04N 13/156* (2018.01)
*H04N 13/232* (2018.01)
*H04N 23/80* (2023.01)

(52) U.S. Cl.
CPC ......... *H04N 13/167* (2018.05); *H04N 5/2628* (2013.01); *H04N 13/156* (2018.05); *H04N 13/232* (2018.05); *H04N 23/80* (2023.01)

(58) Field of Classification Search
CPC .. H04N 13/139; H04N 13/156; H04N 13/167; H04N 13/232; H04N 13/239; H04N 23/55; H04N 23/632; H04N 23/635; H04N 23/69; H04N 23/698; H04N 23/80; H04N 5/2628
See application file for complete search history.

(56) References Cited

U.S. PATENT DOCUMENTS

| 2017/0230587 | A1* | 8/2017 | Kanai | ................. | H04N 23/631 |
| 2019/0014305 | A1* | 1/2019 | Wang | ................. | H04N 19/46 |
| 2020/0177824 | A1* | 6/2020 | Yamaku | ................. | G06T 7/20 |
| 2020/0213575 | A1* | 7/2020 | Shibagami | ........... | H04N 13/398 |
| 2022/0345642 | A1* | 10/2022 | Nakagawa | ........... | H04N 23/632 |

FOREIGN PATENT DOCUMENTS

| JP | H11205817 | A | 7/1999 |
| JP | 2020108112 | A | 7/2020 |
| JP | 2020108114 | A | 7/2020 |
| WO | 2013046886 | A1 | 4/2013 |

\* cited by examiner

*Primary Examiner* — Jessica M Prince
(74) *Attorney, Agent, or Firm* — Canon U.S.A., Inc. IP Division

(57) ABSTRACT

Electronic equipment includes a processor, and a memory storing a program which, when executed by the processor, causes the electronic equipment to acquire a third image in which a first image captured via a first optical system and a second image captured via a second optical system and having parallax with respect to the first image are arranged side by side, apply predetermined processing to a target range included in the third image, and, wherein each of the first image and the second image is a circular region, set a rectangular region circumscribed around a circular region of the first image or a circular region of the second image as a movable region in which the target range included in the third image is movable.

19 Claims, 16 Drawing Sheets

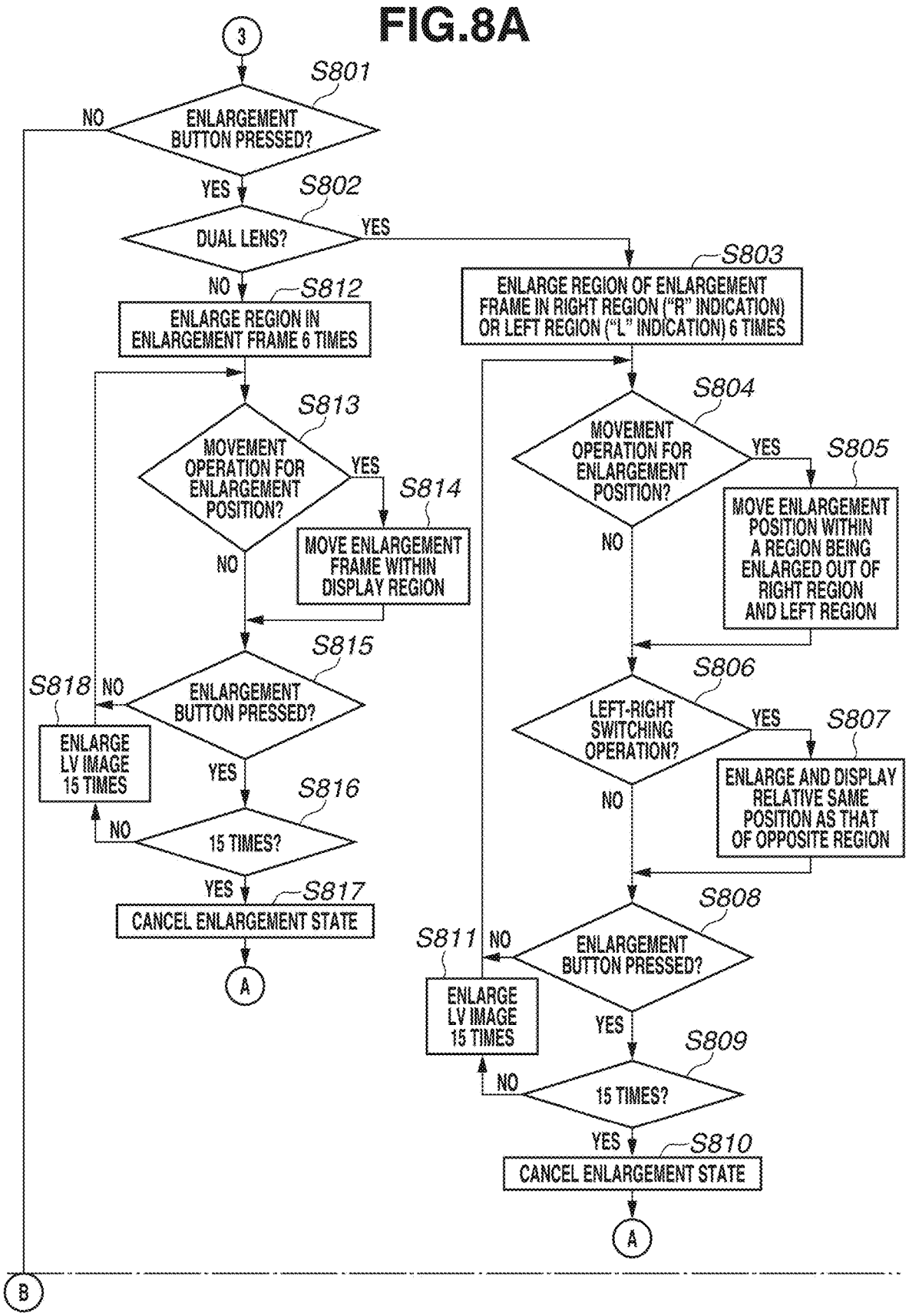

ELECTRONIC EQUIPMENT, CONTROL METHOD THEREFOR, AND STORAGE MEDIUM

BACKGROUND

Technical Field

Aspects of the embodiments generally relate to electronic equipment, a control method therefor, and a storage medium.

Description of the Related Art

Recently, there has been known a digital camera including two lens optical systems. If two optical systems are arranged to enable image capturing in the same direction, the digital camera is able to generate, from two images having parallax acquired via the respective two optical systems, an image obtained by image capturing of a range of 180 degrees (a hemispherical image) or an image available for stereoscopic view. If two optical systems are arranged to enable image capturing in opposite directions, the digital camera is able to generate, from two images acquired via the respective two optical systems, an image obtained by image capturing of a range of 360 degrees (a full spherical image). In a case where a fisheye lens is used to perform image capturing of a wide angle of view, a circular image is acquired.

In the case of capturing two images having parallax by such a digital camera including two optical systems, the user performs image capturing while checking two live view images. With regard to an ordinary camera including a single optical system, the user is allowed to enlarge a single displayed live view image and check the enlarged live view in a minute manner.

Japanese Patent Application Laid-Open No. 2020-108114 discusses that two live view images acquired via two optical systems can be displayed on a single screen. Then, in response to the user performing a pinch-out operation (enlargement instruction) in any one of display regions for the two live view images, the displayed live view is enlarged.

However, with regard to the enlargement instruction discussed in Japanese Patent Application Laid-Open No. 2020-108114, the user is not able to recognize in advance which region is to be enlarged in response to the enlargement instruction. Moreover, in a case where an image is displayed in a circular form on a rectangular screen and only a region other than the image is enlarged for display, even when viewing the enlarged image, the user may be unable to recognize which region of the original image has been enlarged.

SUMMARY

According to an aspect of the embodiments, electronic equipment includes a processor, and a memory storing a program which, when executed by the processor, causes the electronic equipment to acquire a third image in which a first image captured via a first optical system and a second image captured via a second optical system and having parallax with respect to the first image are arranged side by side, apply predetermined processing to a target range included in the third image, and, wherein each of the first image and the second image is a circular region, set a rectangular region circumscribed around a circular region of the first image or a circular region of the second image as a movable region in which the target range included in the third image is movable.

Further features of the disclosure will become apparent from the following description of exemplary embodiments with reference to the attached drawings.

BRIEF DESCRIPTION OF THE DRAWINGS

FIGS. 8A and 8B are flowcharts of enlargement processing and an image capturing operation in the camera with the dual lens mounted thereon.

DESCRIPTION OF THE EMBODIMENTS

Figure 1A:
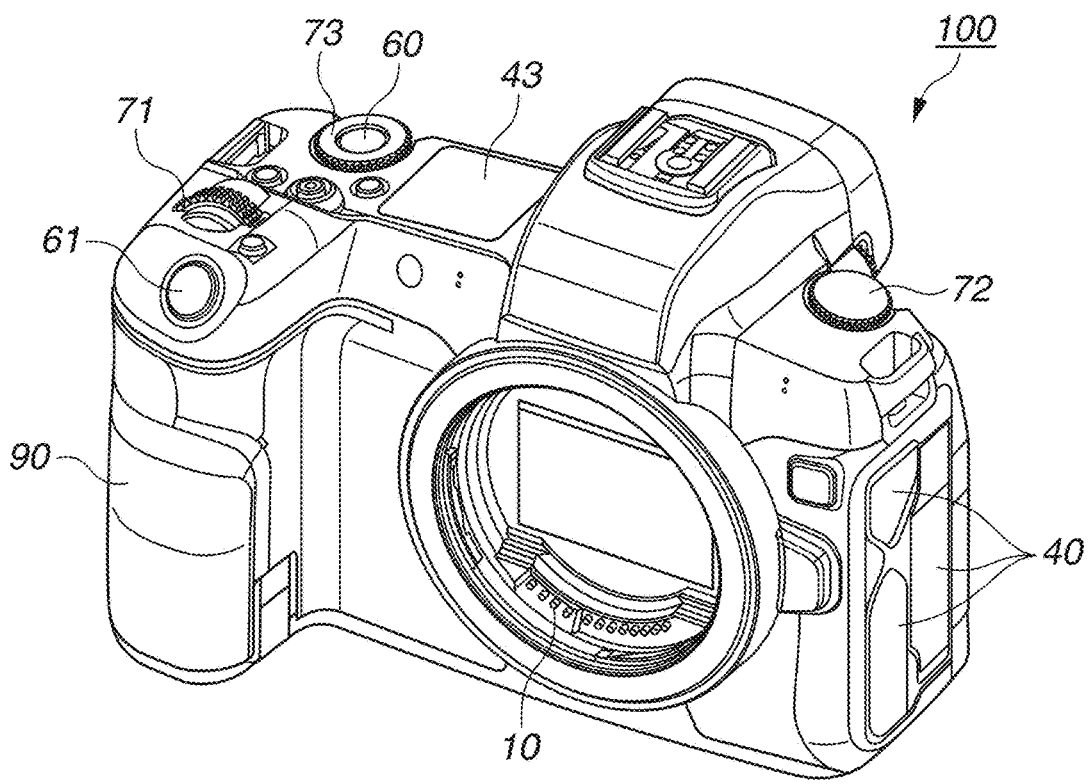
FIGS. 1A and 1B are appearance diagrams of a digital camera.

Various exemplary embodiments, features, and aspects of the disclosure will be described in detail below with reference to the drawings. In the following exemplary embodiments, a case where electronic equipment is a digital camera (imaging apparatus) is described as an example.

The digital camera 100 according to the present exemplary embodiment is able to acquire a dual-lens image in which a left image and a right image having predetermined parallax in the left-right direction are arranged side by side as a single image and display the acquired dual-lens image on a display unit. Moreover, the digital camera 100 is able to apply predetermined image processing to a target range included in an image displayed on the display unit. The predetermined image processing is, for example, enlargement processing, and, in the following description, a case where the predetermined image processing is enlargement processing is described in detail. The digital camera 100 displays, on the display unit, an enlarged image obtained by enlarging the target range according to an enlargement instruction. Furthermore, the predetermined image processing is not limited to enlargement processing. For example, the predetermined image processing can be processing for detecting, for example, a luminance distribution or chromaticity distribution in the target range to generate a histogram or a waveform monitor, or can be processing for applying filter processing, such as contrast enhancement processing, to the target range. While, in the present exemplary embodiment, the enlargement instruction is assumed to be issued in response to a pressing operation on an enlargement button 78, which is a pressable physical member, the enlargement instruction can be issued in response to a pinch-out operation on a touch panel 70a and a cancellation instruction for enlargement displaying can be issued in response to a pinch-in operation thereon.

The digital camera 100 according to the present exemplary embodiment displays an item indicating the target range in a dual-lens image in conformity with the dual-lens image. The item is, for example, a frame-like indicator indicating the target range or a semi-transparent color image which is combined with the target range. The digital camera 100 is able to change a display position of the item (i.e., a target range indicated by the item) according to a user operation. When displaying a dual-lens image, the digital camera 100 displays the item at a position which does not span both a left image and a right image. Thus, the target range is set in such a way as not to include both a left image and a right image. In other words, the target range is set in such a way as to include only one of a left image and a right image.

Even when a user operation for changing a display position of the item (position of the target range) has been performed, the digital camera 100 controls displaying of the item in such a manner that a target range indicated by the item does not span both a left image and a right image.

Figure 1B:
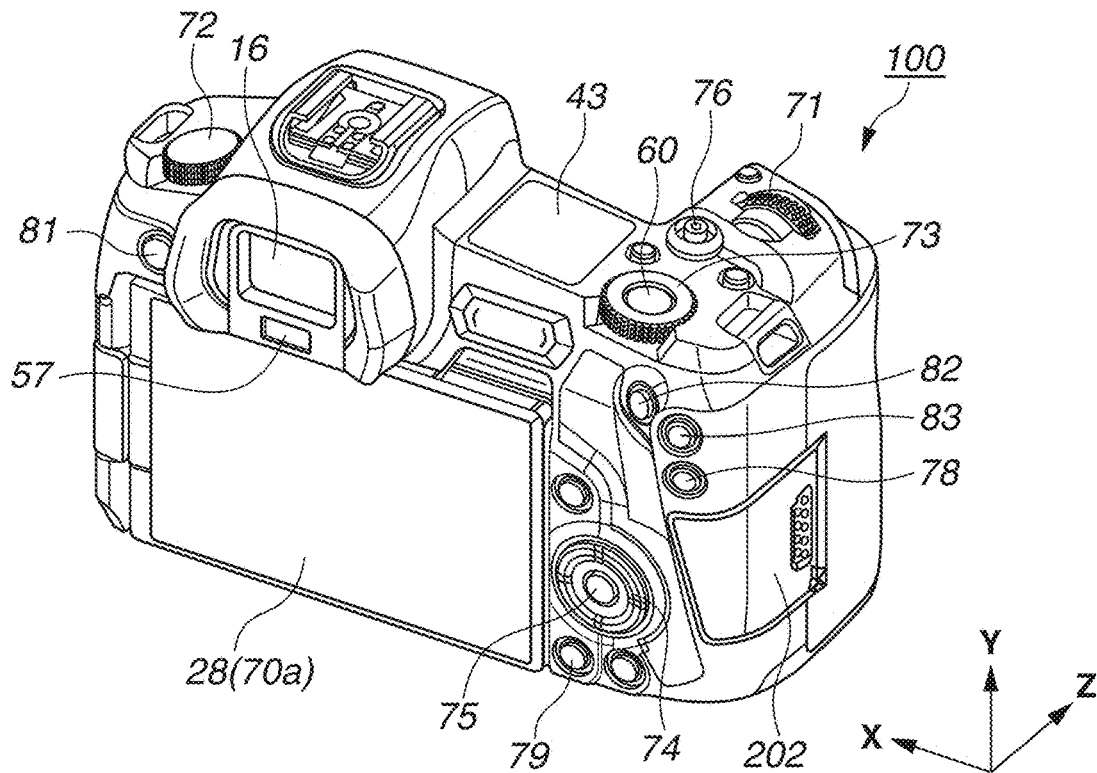

FIGS. 1A and 1B are appearance diagrams of the digital camera 100, which serves as an example of electronic equipment to which the present exemplary embodiment is applicable. FIG. 1A is a front surface perspective view of the digital camera 100, and FIG. 1B is a back surface perspective view of the digital camera 100. Referring to FIGS. 1A and 1B, a display unit 28 is a display unit mounted on the back surface of the digital camera 100, which displays an image and various pieces of information. A touch panel 70a is a touch detection unit capable of detecting a touch operation on the display surface (operation surface) of the display unit 28. An extra-viewfinder display unit 43 is a display unit mounted on the top surface of the digital camera 100, which displays various setting values for the digital camera 100, such as a shutter speed and an aperture value. The display unit 28 may be built into the digital camera 100 or detachably attached to the digital camera 100. Also, the display unit 28 may be an external device connected to a communication unit 54 of the digital camera 100.

A shutter button 61 is an operation unit which is usable to issue an image capturing instruction. A mode selection switch 60 is an operation unit which is usable to switch between various modes. A terminal cover 40 is a cover which protects connectors (not illustrated) of, for example, a connection cable which interconnects an external device and the digital camera 100. A main electronic dial 71 is a rotational operation member included in an operation unit 70 (FIG. 2), so that the main electronic dial 71 can be rotated by the user to perform, for example, changing of setting values such as a shutter speed and an aperture value. A power switch 72 is an operation member which is usable to switch between turning-on and turning-off of the power source of the digital camera 100.

A sub-electronic dial 73 is a rotational operation member included in the operation unit 70, which is usable to perform, for example, movement of a selection frame or image feeding. Arrow keys 74, which are included in the operation unit 70, are arrow keys (four-way keys) in which upper, lower, left, and right arrow portions thereof are able to be pressed. An operation corresponding to a pressed arrow portion of the arrow keys 74 is able to be performed. A SET button 75 is a push button included in the operation unit 70, which is mainly used to, for example, determine a selection item. A moving image button 76 is usable to issue instructions for starting and stopping moving image capturing (recording).

The enlargement button 78 is an operation button included in the operation unit 70, which is usable to perform turning-on and turning off of an enlargement mode in live view display of the image capturing mode. The user is allowed to enlarge or reduce a live view (LV) image by turning on the enlargement mode and then operating the main electronic dial 71. In the playback mode, the enlargement button 78 functions as an enlargement button which is usable to enlarge a played-back image and increase an enlargement factor. A playback button 79, which is included in the operation unit 70, is an operation button used to switch between the image capturing mode and the playback mode. When the playback button 79 is pressed during the image capturing mode, the digital camera 100 transitions to the playback mode, thus causing the display unit 28 to display the latest image out of images recorded on a recording medium 200.

A menu button 81 is included in the operation unit 70, and, when the menu button 81 is pressed, a menu screen which is available for various settings is displayed on the display unit 28. The user is allowed to intuitively perform various settings with use of the menu screen displayed on the display unit 28, the arrow keys 74, and the SET button 75.

A multi-controller 82 is tiltable in 360 degree directions to be used for issuing instructions for eight-way keys, such as up, down, left, and right keys. Moreover, the multi-controller 82 is pushable to be used for activating an allocated function. A display mode switching button 83 is an operation member usable to switch between a plurality of different display modes regarding information, such as a live view image or image capturing information display, which is displayed on the display unit 28 or an electronic viewfinder (EVF) 29. Each time the user presses the display mode switching button 83, switching between display modes is performed, so that the user is able to visually recognize information about an image which is being captured or being played back in the display mode desired by the user.

A communication terminal group 10 is a communication terminal group via which the digital camera 100 performs communication with a lens unit (attachable to and detachable from the digital camera 100).

An eyepiece unit 16 is an eyepiece portion of an eyepiece viewfinder (a looking-into-type viewfinder), so that the user is able to visually recognize a video image displayed on the internal EVF 29 via the eyepiece unit 16. An eye access detection unit 57 is an eye access detection sensor which detects whether the user is accessing the eyepiece unit 16. A lid 202 is the lid of a slot which contains the recording medium 200. A grip portion 90 is a holding portion configured to be in a shape able to be easily gripped by the right hand of the user when the user holds the digital camera 100. The shutter button 61 and the main electronic dial 71 are located at positions where the shutter button 61 and the main electronic dial 71 are able to be operated with the index finger of the right hand in a state in which the user holds the digital camera 100 by gripping the grip portion 90 with the little finger, ring finger, and middle finger of the right hand. Moreover, the sub-electronic dial 73 is located at a position where the sub-electronic dial 73 is able to be operated with the thumb of the right hand in the same state.

Figure 2:
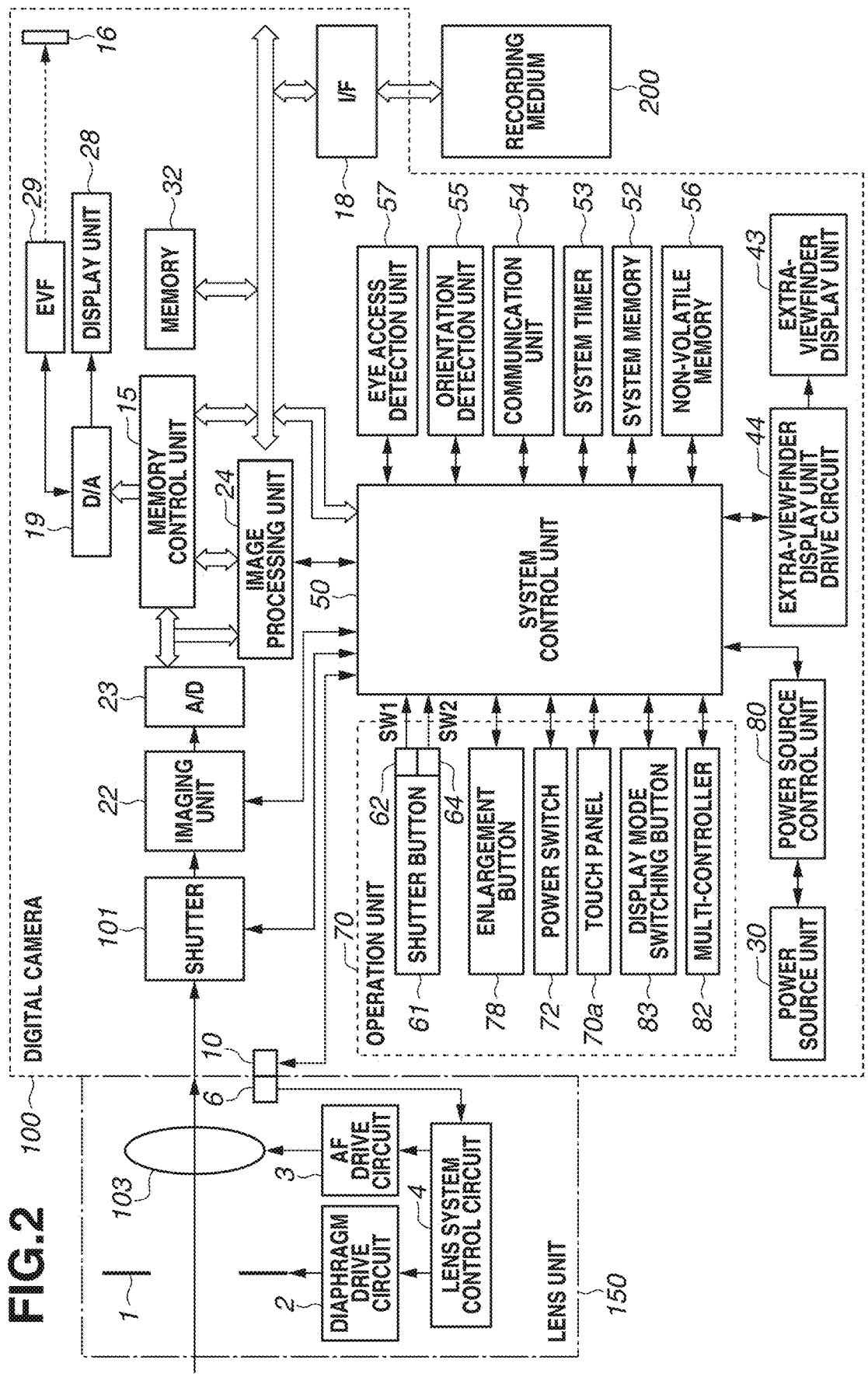
FIG. 2 is a schematic block diagram illustrating a hardware configuration example of the digital camera.

FIG. 2 is a block diagram illustrating a configuration example of the digital camera 100 according to the present exemplary embodiment. In FIG. 2, the lens unit 150 is a lens unit in which an interchangeable image capturing lens is mounted. A lens 103 is usually composed of a plurality of lens elements, but, in FIG. 2, is illustrated simply as a single lens element. A communication terminal group 6 is a communication terminal group used for the lens unit 150 to perform communication with the digital camera 100, and the communication terminal group 10 is a communication terminal group used for the digital camera 100 to perform communication with the lens unit 150. The lens unit 150 performs communication with a system control unit 50 via the communication terminal groups 6 and 10, and causes a lens system control circuit 4, which is included in the lens unit 150, to perform control of a diaphragm 1 via a diaphragm drive circuit 2 and to vary the position of the lens 103 via an autofocus (AF) drive circuit 3, thus adjusting focus. Moreover, the system control unit 50 discriminates the type of the lens unit 150 mounted on the digital camera 100 via the communication terminal groups 6 and 10.

A shutter 101 is a focal plane shutter capable of freely controlling the exposure time of the imaging unit 22 under the control of the system control unit 50.

The imaging unit 22 is an image sensor configured with, for example, a charge-coupled device (CCD) sensor or a complementary metal-oxide semiconductor (CMOS) sensor, which converts an optical image into an electrical signal. The imaging unit 22 can include an imaging plane phase-difference sensor which outputs defocus amount information to the system control unit 50. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as reduction, and color conversion processing on the data output from the A/D converter 23 or data output from a memory control unit 15. Moreover, the image processing unit 24 performs predetermined calculation processing using the captured image data. The system control unit 50 performs exposure control and distance measurement control based on a calculation result obtained by the image processing unit 24. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

Data output from the A/D converter 23 is then written in the memory 32 via the image processing unit 24 and the memory control unit 15 or directly via the memory control unit 15 without via the image processing unit 24. The memory 32 stores image data acquired by the imaging unit 22 and converted into digital data by the A/D converter 23 or image data that is to be displayed on the display unit 28 and the EVF 29. The memory 32 has a storage capacity sufficient to store a predetermined number of still images or a moving image and sound taken for a predetermined time.

Moreover, the memory 32 also serves as a memory for image display (video memory). A digital-to-analog (D/A) converter 19 converts data for image display stored in the memory 32 into an analog signal and supplies the analog signal to the display unit 28 and the EVF 29. In this way, image data for display written in the memory 32 is displayed by the display unit 28 and the EVF 29 via the D/A converter 19. Each of the display unit 28 and the EVF 29 performs displaying corresponding to an analog signal output from the D/A converter 19 on a display device such as a liquid crystal display (LCD) or an organic electroluminescent (EL) display. Sequentially transferring to and displaying on the display unit 28 or the EVF 29 a signal obtained by the D/A converter 19 performing digital-to-analog conversion of the data analog-to-digital converted by the A/D converter 23 and stored in the memory 32 enables performing live view display (LV display). Hereinafter, an image which is displayed in live view is referred to as a "live view image (LV image)".

Various camera setting values, including a shutter speed and an aperture value, are displayed on the extra-viewfinder display unit 43 via an extra-viewfinder display unit drive circuit 44.

A non-volatile memory 56 is an electrically erasable and recordable memory, for which, for example, an electrically erasable programmable read-only memory (EEPROM) is used. For example, constants and a program for operations of the system control unit 50 are stored in the non-volatile memory 56. The program as used here is a computer program (computer-executable instructions) which is executed to implement various flowcharts described below in the present exemplary embodiment.

The system control unit 50 is a control unit composed of at least one processor or circuit, and controls the entire digital camera 100. The system control unit 50 implements various processing operations described below in the present exemplary embodiment by executing the above-mentioned program recorded on the above-mentioned non-volatile memory 56. A system memory 52 includes, for example, a random access memory (RAM), on which, for example, constants and variables for operations of the system control unit 50 and a program read out from the non-volatile memory 56 are loaded. Moreover, the system control unit 50 also performs display control by controlling, for example, the memory 32, the D/A converter 19, and the display unit 28.

A system timer 53 is a timer unit which measures times for use in various control operations and time in a built-in clock.

The operation unit 70 is an operation unit which is operable to input various operation instructions to the system control unit 50.

The mode selection switch 60, which is included in the operation unit 70, switches an operation mode of the system control unit 50 to any one of, for example, a still image capturing mode, a moving image capturing mode, and a playback mode. Modes included in the still image capturing mode include an automatic image capturing mode, an automatic scene discrimination mode, a manual mode, an aperture priority mode (Av mode), a shutter speed priority mode (Tv mode), and a program automatic exposure (AE) mode (P mode). Moreover, the modes included in the still image capturing mode further include, for example, various scene modes in which image capturing settings for the respective image capturing scenes are performed and a custom mode. The mode selection switch 60 is used to directly switch the operation mode of the system control unit 50 to any one of these modes. Alternatively, after switching to displaying of a list screen for image capturing modes is once performed by the mode selection switch 60, another operation member can also be used to perform switching to any one of a plurality of image capturing modes displayed in the list screen. Likewise, a plurality of modes can also be included in the moving image capturing mode.

The first shutter switch 62 is configured to be turned on in response to a halfway operation, in other words, a half-pressed state, of the shutter button 61 of the digital camera 100 (an image capturing preparation instruction), thus generating a first shutter switch signal SW1. In response to the first shutter switch signal SW1, image capturing preparation operations, such as autofocus (AF) processing, automatic exposure (AE) processing, automatic white balance (AWB) processing, and flash preliminary emission (EF) processing, are started.

The second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a signal readout operation from the imaging unit 22 and leading to a writing operation for the captured image data as an image file to the recording medium 200.

The operation unit 70 includes various operation members serving as input units which receive operations from the user. The operation unit 70 includes at least the following operation members. The operation members include the shutter button 61, the main electronic dial 71, the power switch 72, the sub-electronic dial 73, the arrow keys 74, the SET button 75, the moving image button 76, an AF lock button 77, the enlargement button 78, the playback button 79, the menu button 81, and the multi-controller 82. The operation unit 70 further includes various operation members which are not particularly illustrated in the block diagram of FIG. 2.

A power source control unit 80 is configured with, for example, a battery detection circuit, a direct current (DC)-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, and supplies required voltages to various portions, including the recording medium 200, for respective required periods. A power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

A recording medium interface (I/F) 18 is an interface with the recording medium 200, such as a memory card or a hard disk. The recording medium 200 is a recording medium, such as a memory card, which is used to record the captured image, and is configured with, for example, a semiconductor memory or a magnetic disc.

The communication unit 54 connects to an external device or a network via wireless or via a wired cable, and performs transmission and reception of, for example, a video signal and an audio signal. The communication unit 54 is also able to connect to a wireless local area network (LAN) or the Internet. Moreover, the communication unit 54 is also able to connect to an external device via Bluetooth® or Bluetooth® Low Energy. The communication unit 54 is able to transmit an image (including a live view (LV) image) captured by the imaging unit 22 and an image recorded on the recording medium 200, and is also able to receive an image or various other pieces of information from an external device.

An orientation detection unit 55 detects the orientation of the digital camera 100 with respect to the direction of gravitational force. Whether an image captured by the imaging unit 22 is an image captured with the digital camera 100 held in a landscape orientation or an image captured with the digital camera 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor. The acceleration sensor or gyroscope sensor serving as the orientation detection unit 55 is also able to be used to detect motions of the digital camera 100 (for example, panning, tilting, lifting, and remaining still or not).

The eye access detection unit 57 is an eye access detection sensor which detects the access (eye access) and the departure (eye departure) of the eye of the user (an object) with respect to the eyepiece unit 16 (i.e., performs access detection). The system control unit 50 switches between displaying (display state) and non-displaying (non-display state) of each of the display unit 28 and the EVF 29 according to the state detected by the eye access detection unit 57. More specifically, in a case where the digital camera 100 is at least in an image capturing waiting state and the switching setting for a display destination is automatic switching setting, during non-eye access, the system control unit 50 sets the display unit 28 as the display destination, thus turning on displaying of the display unit 28 and setting the EVF 29 to non-displaying. Moreover, during eye access, the system control unit 50 sets the EVF 29 as the display destination, thus turning on displaying of the EVF 29 and setting the display unit 28 to non-displaying.

The eye access detection unit 57 can be configured with, for example, an infrared proximity sensor, and is able to detect the access of an object of some kind to the eyepiece unit 16 of the viewfinder having the EVF 29 incorporated therein. In a case where an object has accessed the eyepiece unit 16, infrared light projected from a light projection portion (not illustrated) of the eye access detection unit 57 is reflected from the object and is then received by a light receiving portion (not illustrated) of the eye access detection unit 57. The eye access detection unit 57 is also able to discriminate up to which distance to the eyepiece unit 16 the object has come close (eye access distance), based on the amount of the received infrared light. In this way, the eye access detection unit 57 performs eye access detection for detecting the access distance of the object to the eyepiece unit 16.

In a case where, starting with the non-eye access state (non-access state), an object which comes close to the eyepiece unit 16 within a predetermined distance has been detected, the eye access detection unit 57 is assumed to detect that eye access has been performed. In a case where, starting with the eye access state (access state), an object the access of which has been detected departs from the eyepiece unit 16 by a predetermined distance or more, the eye access detection unit 57 is assumed to detect that eye departure has been performed. A threshold value used for detecting eye access and a threshold value used for detecting eye departure can be made different from each other by providing, for example, a hysteresis. Moreover, after detecting eye access, the eye access detection unit 57 is assumed to detect that the eye access state continues until detecting eye departure. After detecting eye departure, the eye access detection unit 57 is assumed to detect that the non-eye access state continues until detecting eye access. Furthermore, the infrared proximity sensor is merely an example, and the eye access detection unit 57 can be configured with another type of sensor as long as it is able to detect the access of the eye or object which is able to be deemed as eye access.

The touch panel 70*a* and the display unit 28 can be configured in an integrated manner. For example, the touch panel 70*a* is configured to have such a light transmittance as not to hinder displaying performed by the display unit 28, and is attached to the upper layer of a display surface of the display unit 28. Then, the input coordinates in the touch panel 70*a* are associated with the display coordinates on a display screen of the display unit 28. With this, a graphical user interface (GUI) can be configured as if the user were able to directly operate a screen displayed on the display unit 28. The system control unit 50 is able to detect the following operations performed on the touch panel 70*a* or states thereof:

- the state in which a finger or pen, which has not been touching the touch panel 70*a*, has newly touched the touch panel 70*a*, in other words, starting of a touch (hereinafter referred to as "touch-down");
- the state in which a finger or pen is touching the touch panel 70*a* (hereinafter referred to as "touch-on");
- the state in which a finger or pen is moving while touching the touch panel 70*a* (hereinafter referred to as "touch-move");
- the state in which a finger or pen, which has been touching the touch panel 70*a*, has been separated from the touch panel 70*a*, in other words, ending of a touch (hereinafter referred to as "touch-up"); and
- the state in which none is touching the touch panel 70*a* (hereinafter referred to as "touch-off").

When touch-down is detected, touch-on is also detected at the same time. After touch-down, unless touch-up is detected, touch-on normally continues being detected. Touch-move is also detected in the state in which touch-on is detected. Even if touch-on is detected, unless the touch position is not moving, touch-move is not detected. After touch-up of all of the fingers or pen touching the touch panel 70*a* is detected, touch-off is detected.

Information on these operations or states and the coordinates of a position at which a finger or pen is touching the touch panel 70*a* is communicated to the system control unit 50 via an internal bus, and then, the system control unit 50 determines how an operation (touch operation) has been performed on the touch panel 70*a* based on the communicated information.

With regard to touch-move, the system control unit 50 is able to also detect the direction of movement of a finger or pen moving on the touch panel 70*a* for each of a vertical component and a horizontal component on the touch panel 70*a* based on a change of the position coordinates.

When it is detected that touch-move has been performed a predetermined distance or more, the system control unit 50 is assumed to determine that a slide operation has been performed. An operation of quickly moving the finger a certain degree of distance while keeping the finger touching the touch panel 70*a* and then directly separating the finger from the touch panel 70*a* is referred to as "flick". In other words, the flick is an operation of quickly tracing the surface of the touch panel 70*a* as if flicking the touch panel 70*a* with the finger. When touch-move performed a predetermined distance or more at a predetermined speed or higher is detected and touch-up is then detected, the system control unit 50 determines that flick has been performed (determines that flick has been performed subsequent to a slide operation).

Additionally, a touch operation of concurrently touching a plurality of positions (for example, two points) and then moving the touch positions closer to each other is referred to as "pinch-in", and a touch operation of moving the touch positions away from each other is referred to as "pinch-out". Pinch-out and pinch-in are collectively referred to as a "pinch operation" (or simply as "pinch"). The touch panel 70*a* can be any type of touch panel selected from among touch panels of various types including, for example, the resistance film type, the capacitance type, the surface acoustic wave type, the infrared ray type, the electromagnetic induction type, the image recognition type, and the optical sensor type. Among these types, there are a type which detects that touch has been performed based on contact with the touch panel and a type which detects that touch has been performed based on access of a finger or pen to the touch panel, but any one of the two types can be employed.

Figure 3:
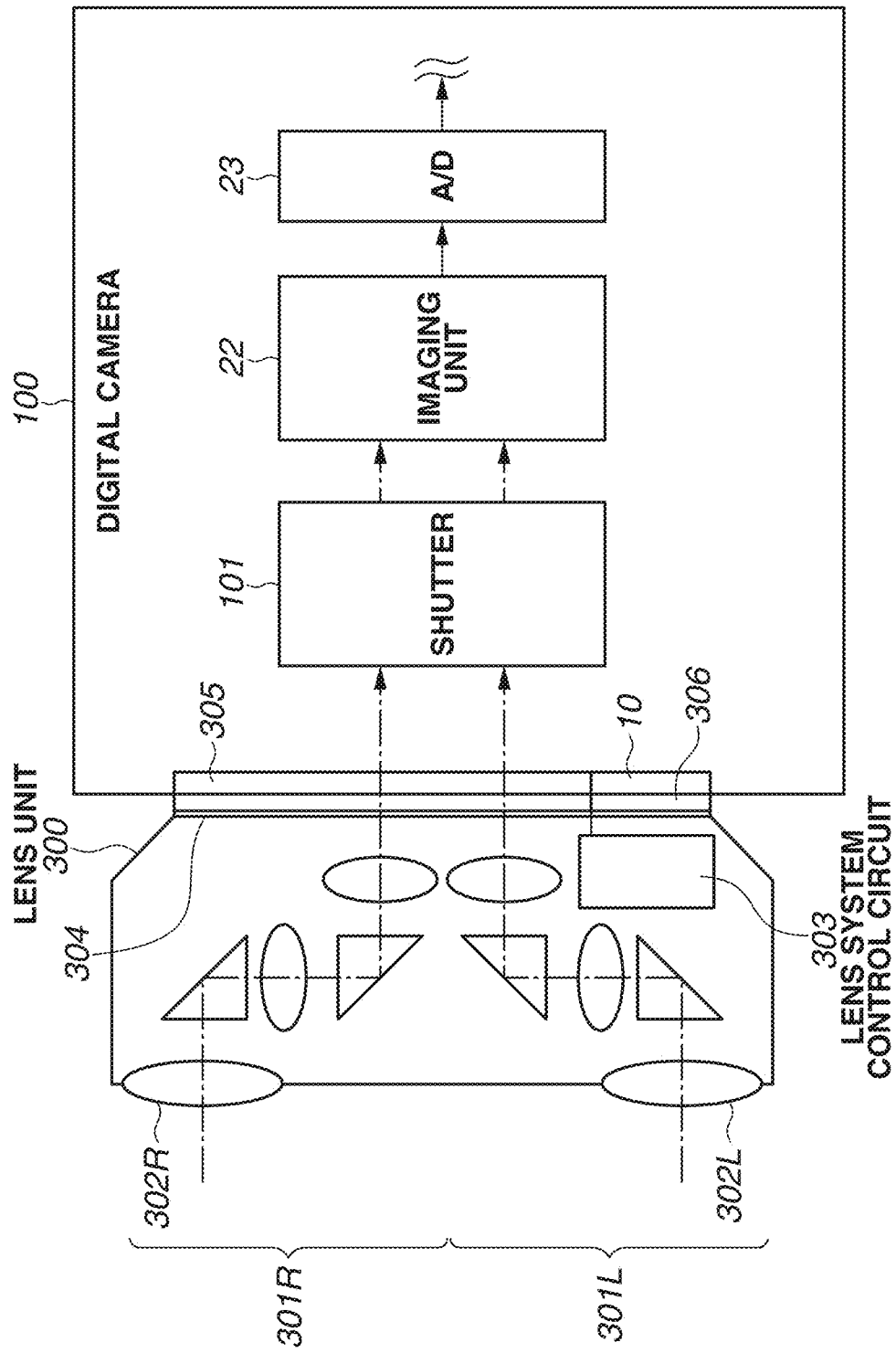
FIG. 3 is a schematic diagram illustrating an example of a configuration of a lens unit.

FIG. 3 is a schematic diagram illustrating an example of a configuration of a lens unit 300. FIG. 3 illustrates a state in which the lens unit 300 has been mounted on the digital camera 100. Furthermore, in the digital camera 100 illustrated in FIG. 3, the same constituent elements as the respective constituent elements illustrated in FIG. 2 are assigned the respective same reference characters and are omitted from description here.

The lens unit 300 is a type of interchangeable lens which is detachably attachable to the digital camera 100. The lens unit 300 is a dual lens capable of being used for acquiring optical images having parallax between a left image and a right image. The lens unit 300 includes two optical systems (image capturing lenses), each of which has a wide field of view of 180 degrees and is capable of being used to perform image capturing of a front hemispheric range. Specifically, each of two optical systems of the lens unit 300 is capable of inputting an optical image of subjects included in a field of view portion of 180 degrees in the left-right direction (horizontal angle, azimuth angle, or yaw angle) and 180 degrees in the up-down direction (vertical angle, elevation or depression angle, or pitch angle).

The lens unit 300 includes a right eye optical system 301R, which includes, for example, a plurality of lenses and reflecting mirrors, a left eye optical system 301L, which includes, for example, a plurality of lenses and reflecting mirrors, and a lens system control circuit 303. The right eye optical system 301R corresponds to an example of a first optical system, and the left eye optical system 301L corresponds to an example of a second optical system. Respective lenses 302R and 302L included in the right eye optical system 301R and the left eye optical system 301L and each located at the subject side thereof face in the same direction and have respective optical axes parallel to each other. Moreover, each of the right eye optical system 301R and the left eye optical system 301L is what is called a fisheye lens, so that two circular optical images are formed on the imaging unit 22 (image sensor). An optical image (left image) input via the left eye optical system 301L and an optical image (right image) input via the right eye optical system 301R are formed on the imaging plane of the single imaging unit 22, so that the imaging unit 22 acquires images including the left image and the right image.

The lens unit 300 in the present exemplary embodiment is a VR180 lens, which is used to perform image capturing for what is called VR180 serving as a virtual reality (VR) image format capable of dual-lens stereoscopic viewing. In the VR180 lens, each of the right eye optical system 301R and the left eye optical system 301L includes a fisheye lens capable of capturing a range of 180 degrees. Furthermore, in the VR180 lens, each of the right eye optical system 301R and the left eye optical system 301L only needs to be capable of acquiring video available for dual-lens VR display as VR180, and can be a lens capable of capturing a range of a wide angle of view of about 160 degrees narrower than the range of 180 degrees. The VR180 lens is capable of forming, on one or two image sensors of a camera with the VR180 lens mounted thereon, a right image (first image) formed via the right eye optical system 301R and a left image (second image) formed via the left eye optical system 301L and having parallax with respect to the right image. In the digital camera 100 according to the present exemplary embodiment, the right image and the left image are assumed to be formed on a single image sensor (sensor), and a single image in which an image corresponding to the right image and an image corresponding to the left image are arranged side by side in the left-right direction (dual-lens image) is assumed to be formed. The thus-formed dual-lens image includes an image corresponding to the right image, an image corresponding to the left image, and a region in which no optical image is formed (hatched portion).

Moreover, the lens unit 300 is mounted on the digital camera 100 via a lens mount portion 304 and a camera mount portion 305 of the digital camera 100. With this mounting, the system control unit 50 of the digital camera 100 and the lens system control circuit 303 of the lens unit 300 are electrically connected to each other via a communication terminal group 10 of the digital camera 100 and a communication terminal group 306 of the lens unit 300.

In the present exemplary embodiment, a right image formed via the right eye optical system 301R and a left image formed via the left eye optical system 301L and having parallax with respect to the right image are formed side by side on the imaging unit 22 of the digital camera 100. Thus, two optical images formed by the right eye optical system 301R and the left eye optical system 301L are formed on a single image sensor. The imaging unit 22 converts the formed subject images (light signals) into analog electrical signals to acquire image data about a dual-lens image. In this way, using the lens unit 300 enables acquiring two images having parallax concurrently (as a set) from two portions (optical systems), i.e., the right eye optical system 301R and the left eye optical system 301L. Moreover, performing VR display of the acquired images separately as a left-eye image and a right-eye image enables the user to view a stereoscopic VR image in a range of 180 degrees, what is called VR180 video.

Conventionally, in an ordinary single lens, an image having entered the lens inverts symmetrically with respect to a point being the optical axis center and is made incident on a sensor. An imaging apparatus such as the digital camera 100 performs generation of an image free from uncomfortable feeling (non-inverting image) by performing, for example, inversion processing of the order of reading from the sensor or the read image. On the other hand, in the case of a dual lens, while the up-down relationship inverts symmetrically with respect to a point and is made incident on the sensor, the left-right relationship does not invert and is made incident on the sensor with an image acquired via the left eye optical system serving as a left-side image and an image acquired via the right eye optical system serving as a right-side image. Therefore, if inversion processing is performed as in a conventional way, the left-right relationship in the digital camera 100 and the left-right relationship in the images obtained by inversion processing become opposite to each other, in other words, an image acquired via the left eye optical system is displayed at the right side and an image acquired via the right eye optical system is displayed at the left side.

Here, the VR image is an image available for VR display described below. The VR image includes, for example, an omnidirectional image (full spherical image) captured by an omnidirectional camera (full spherical camera) or a panoramic image with a video range (effective video range) wider than a display range able to be displayed at one time on a display unit. Moreover, the VR image is not limited to a still image, but also includes a moving image and a live image (an image acquired from the camera almost in real time). The VR image has a video range (effective video range) corresponding to a field of view of up to 360 degrees in the left-right direction and 360 degrees in the up-down direction. Moreover, the VR image also includes an image having an angle of view of less than 360 degrees in the left-right direction and less than 360 degrees in the up-down direction but wider than an angle of view able to be captured by an ordinary camera or having a video range wider than a display range able to be displayed at one time on a display unit. An image which is captured by the digital camera 100 with use of the above-mentioned lens unit 300 is a type of VR image. The VR image is able to be displayed for VR display by, for example, setting the display mode of a display device (a display device capable of displaying a VR image) to "YR view". When causing a VR image having an angle of view of 360 degrees to be displayed for VR display and changing the orientation of the display device in the left-right direction (horizontal rotational direction), the user is able to view an omnidirectional video which is seamless in the left-right direction.

Here, the VR display (VR view) is a display method (display mode) capable of changing a display range in which to display a video image having a field of view corresponding to the orientation of the display device in a VR image. The VR display includes "single-lens VR display (single-lens VR view), which performs deformation to map a VR image to a virtual sphere (deformation subjected to distortion correction) and displays a single deformed VR image. Moreover, the VR display also includes "dual-lens VR display (dual-lens VR view), which performs deformation to map a left-eye VR image and a right-eye VR image to respective virtual spheres and displays the deformed VR images side by side at left and right areas. Performing "dual-lens VR display" using a left-eye VR image and a right-eye VR image having parallax with respect to each other enables stereoscopic viewing.

With any type of VR display used, for example, in a case where the user wears a display device such as a head-mounted display (HMD), a video image in a field of view range corresponding to the direction of the face of the user is displayed. For example, suppose that, in a VR image, a video image in a field of view range the center of which is located at 0 degrees in the left-right direction (a specific azimuth direction, e.g., north) and at 90 degrees in the up-down direction (90 degrees from the zenith, i.e., the horizon) is displayed at a given point of time. When, from this state, the user reverses the orientation of the display device between front and back sides (for example, changes the display surface from orientation to the south to orientation to the north), the display range is changed to a video image in a field of view range the center of which is located at 180 degrees in the left-right direction (an opposite azimuth direction, e.g., south) and at 90 degrees in the up-down direction in the same VR image. Thus, when the user with the HMD worn thereon turns the face from the north to the south (i.e., faces rearward), a video image which is being displayed in the HMD is changed from a video image in the north to a video image in the south.

Furthermore, a VR image captured with use of the lens unit 300 in the present exemplary embodiment is a VR180 image obtained by performing image capturing of a range of forward 180 degrees, and there is no video image in a range of backward 180 degrees. When such a VR180 image is displayed for VR display, in a case where the user has changed the orientation of the display device to the side in which there is no video image, a blank area is displayed.

Displaying a VR image for VR display in the above-mentioned way causes the user to have a feeling of being visually in a VR image (in a VR space). Furthermore, the display method for a VR image is not limited to a method of changing the orientation of the display device. For example, the display range can be moved (scrolled) in response to a user operation performed via, for example, a touch panel or direction buttons. Moreover, at the time of VR display (at the time of the display mode "YR view"), in addition to changing of the display range by the orientation change, the display range can also be changed in response to, for example, touch-move at the touch panel, a drag operation of, for example, a mouse, or pressing of a direction button. Furthermore, a smartphone mounted on a VR goggle (head-mounted adapter) is a type of HMD.

A dual-lens image which is captured in the digital camera 100 configured as described above via the lens unit 300 is an image including a right image and a left image input to the imaging unit 22 via the right eye optical system and the left eye optical system. Moreover, the user who is using the digital camera 100 may perform an operation to enlarge and display a part of a live view image or a recorded image to check details of the image. When performing an operation for enlargement, the user may uniquely set the center position of a range targeted for enlargement of an image as the center position of the whole image.

In the case of enlarging a part of a dual-lens image to check the part of the dual-lens image, it is desirable to display only a part of the right image or left image. If, at the time of enlargement, the center position of a range targeted for enlargement of an image is uniquely set as the center position of the whole image, in a case where parts of both the right image and the left image are included in the enlarged image, it is difficult for the user to intuitively recognize which portion in the original image the enlarged image is showing. Specifically, an image in which a left end portion of the right image is shown as a right-hand portion of the enlarged image and a right end portion of the left image is shown as a left-hand portion of the enlarged image may be obtained, so that an enlarged image which differs in left-right positional relationship from a field of view targeted for image capturing may be obtained.

Therefore, in the present exemplary embodiment, processing which the digital camera 100 performs for live view enlargement processing suitable for performing image capturing with a dual lens such as the lens unit 300 is described with reference to the flowchart of FIG. 4.

Figure 4:
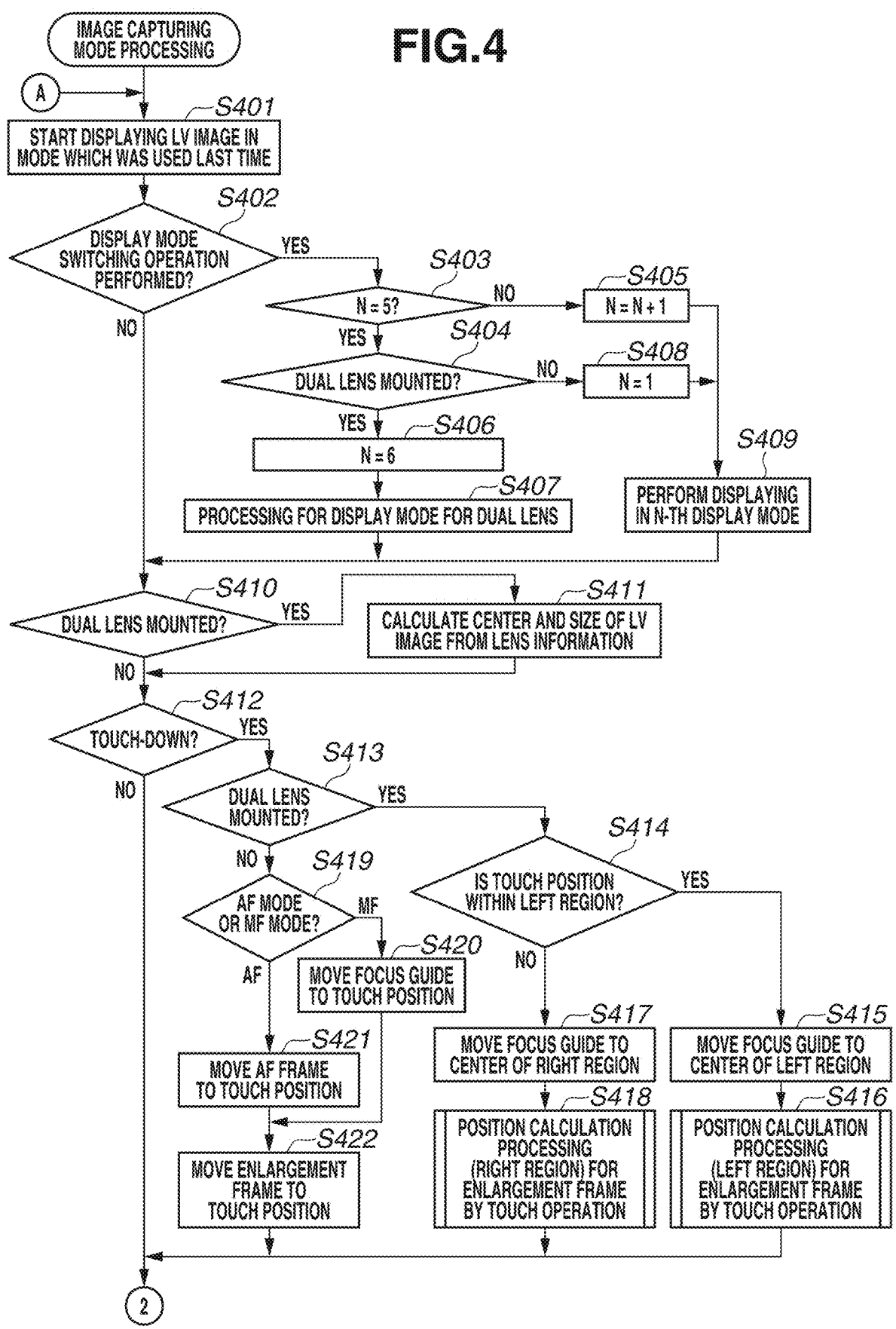
FIG. 4 is a flowchart illustrating switching processing of display modes and control processing at the time of a touch-down operation in the camera with a dual lens (VR180 lens) mounted thereon.

FIG. 4 is a flowchart illustrating an example of processing which the digital camera 100 performs in the image capturing mode. The flowchart of FIG. 4 is implemented by the system control unit 50 loading a program stored in the non-volatile memory 56 onto the system memory 52 and executing the program. Moreover, the flowchart of FIG. 4 is started when the digital camera 100 is powered on and is in the image capturing waiting state. When starting the control flowchart of FIG. 4, the system control unit 50 initializes, for example, control variables and then starts processing.

Moreover, examples of displaying on the display unit 28 in a case where the control flowchart of FIG. 4 is performed are described with reference to FIGS. 5A, 5B, 5C, 5D, 5E, and 5F. Furthermore, details of examples of displaying illustrated in FIGS. 5A to 5F are described after the control flowchart of FIG. 4 is described.

In step S401, the system control unit 50 acquires a display mode which was used last time from a flag (N) stored in the non-volatile memory 56 and performs displaying of a live view image and information concerning image capturing on the display unit 28 based on the display mode which was used last time. For example, in a case where the flow is started in response to the system control unit 50 being powered on, the display mode which was used last time is a display mode which had previously been used at the time when the system control unit 50 was powered off. Alternatively, in a case where the flow is started in response to the system control unit 50 transitioning from a mode other than the image capturing mode, such as a playback mode, to the image capturing mode, the display mode which was used last time is a display mode which had been used at timing when processing had been performed in the image capturing mode last time.

In step S402, the system control unit 50 determines whether the display mode switching button 83 has been pressed. If it is determined that the display mode switching button 83 has been pressed (YES in step S402), the system control unit 50 advances the processing to step S403, and, if not so (NO in step S402), the system control unit 50 advances the processing to step S410.

In step S403, the system control unit 50 refers to the system memory 52 and determines whether the flag N indicating a display mode is 5 (N=5). If it is determined that N=5 (YES in step S403), the system control unit 50 advances the processing to step S404, and, if not so (NO in step S403), the system control unit 50 advances the processing to step S405.

In step S404, the system control unit 50 determines whether the lens mounted via the communication terminal groups 6 and 10 is a dual lens (i.e., a VR180 lens). If it is determined that the mounted lens is a dual lens (YES in step S404), the system control unit 50 advances the processing to step S406, and, if not so (i.e., the mounted lens is an ordinary single lens or no lens is mounted) (NO in step S404), the system control unit 50 advances the processing to step S408. The dual lens is a lens unit including a left-side lens and a right-side lens, each of which is a wide-angle fisheye lens capable of capturing a range of at least 180 degrees included in a range on a side at which each lens is arranged, i.e., on a subject side. Data about a left image and data about a right image captured via the left eye optical system 301L and the right eye optical system 301R are able to be acquired by one or two image sensors.

In step S405, since a result of the determination in step S403 is NO, the system control unit 50 increments the flag N indicating a display mode by one (N=N+1), and stores the incremented flag N in the system memory 52.

In step S406, the system control unit 50 sets the flag N to 6 (N=6), and stores the set flag N in the system memory 52.

In step S407, in a case where N=6, the system control unit 50 displays a display mode exclusive for a dual lens on the display unit 28. An example of display provided at that time is illustrated in FIG. 5F. FIG. 5F is explained in detail below.

In step S408, since a result of the determination in step S404 is NO, the system control unit 50 sets the flag N to 1 (N=1), and stores the set flag N in the system memory 52.

In step S409, the system control unit 50 performs, on the display unit 28, displaying of a live view image and information in a display mode corresponding to a numerical value of the flag N stored in the system memory 52. Examples of display corresponding to the display mode for displaying on the display unit 28 are illustrated in FIGS. 5A to 5E. Since, in a case where a result of the determination in step S404 is NO, the processing also comes at step S409, such displaying of a live view image and information is also performed when a dual lens is not mounted, i.e., when a single lens is mounted or no lens is mounted.

Displaying of a live view (LV) image and information which are displayed on the display unit 28 is described with reference to FIGS. 5A to 5F. While FIGS. 5A to 5F illustrate displaying of two LV images in a state in which a dual lens (VR180 lens) is mounted on the digital camera 100, in a case where a single lens is mounted, one LV image is displayed and displaying of information other than the LV image is similarly displayed. In case where a single lens is mounted, as mentioned above with reference to FIG. 4, there is no transition to the display mode illustrated in FIG. 5F. Each time a switching operation for a display mode (in the present exemplary embodiment, pressing of the display mode switching button 83) is performed by the user, information which is displayed on the display unit 28 is made to vary. Specifically, displaying illustrated in FIGS. 5A to 5F is performed according to the numerical value of the flag N indicating a display mode described above with reference to FIG. 4. Furthermore, while, in the present exemplary embodiment, an LV image which is displayed on the display unit 28 is a circular fisheye view, the present exemplary embodiment is not limited to this, and equirectangular (equidistant cylindrical projection) conversion processing can be performed on an LV image generated as a circular fisheye view to acquire an equirectangular view.

Figure 5A:
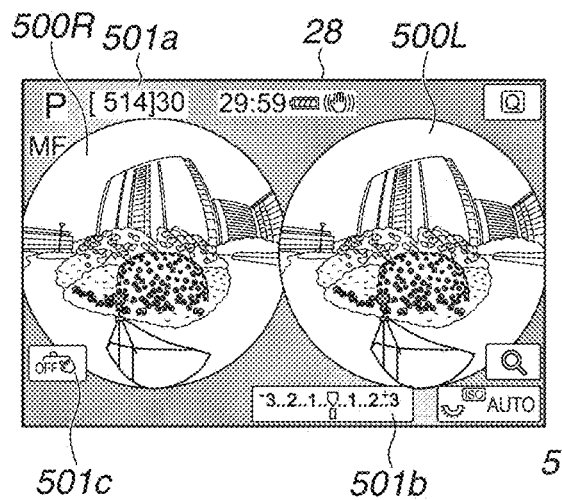
FIGS. 5A, 5B, 5C, 5D, 5E, and 5F are diagrams illustrating examples of live view display in the camera with the dual lens (VR180 lens) mounted thereon.

FIG. 5A illustrates a display mode which is used when the flag N=1, i.e., when the digital camera 100 is powered on and LV images are displayed on the display unit 28 in the image capturing waiting state. Two LV images (LV image 500R and LV image 500L) are displayed side by side in the left-right direction and information indications 501a to 501c are also displayed on the display unit 28. At this time, two LV images arranged side by side in the left-right direction are referred to as "side-by-side images". The information indications 501a to 501c, which indicate image capturing information, are minimum information indications for the user to perform image capturing. In response to the display mode switching button 83 being pressed in the state illustrated in FIG. 5A, a transition to displaying illustrated in FIG. 5B occurs.

Figure 5B:
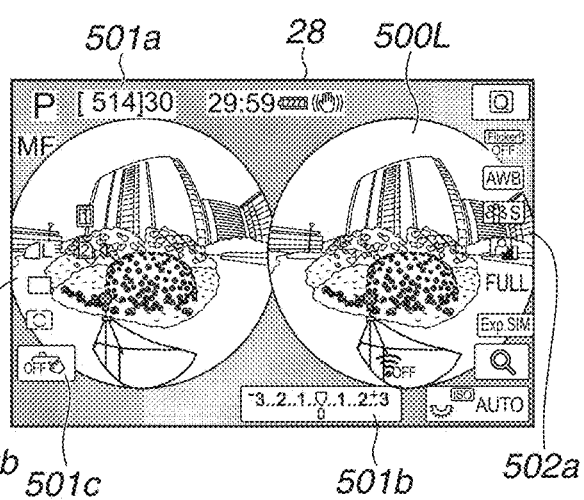

FIG. 5B illustrates a display mode which is used when the flag N=2. In FIG. 5B, in addition to the LV image 500R, the LV image 500L, and the information indications 501a to 501c, information indications 502a and 502b are displayed. The information indications 502a and 502b, which indicate image capturing information as with the information indications 501a to 501c, are used to display various pieces of information concerning image capturing (for example, the currently set setting values and the type of the recording medium 200 currently inserted. Since the amount of information increases as compared with a case where only the information indications 501a to 501c are displayed, the user is enabled to visually recognize a large number of pieces of image capturing information. On the other hand, the visibility of LV images may decrease. In response to the display mode switching button 83 being pressed in the state illustrated in FIG. 5B, a transition to displaying illustrated in FIG. 5C occurs.

Figure 5C:
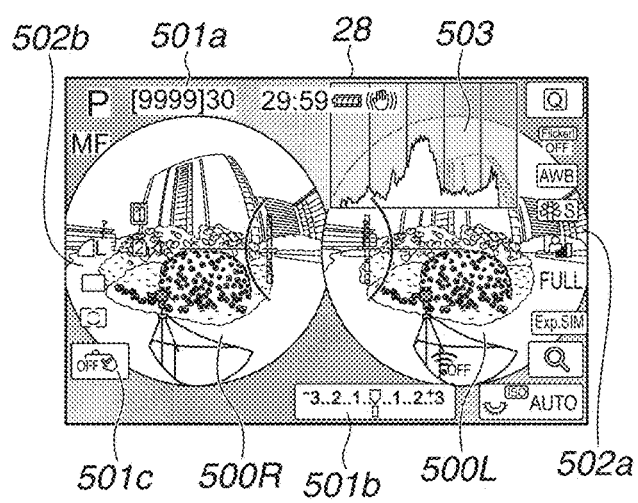

FIG. 5C illustrates a display mode which is used when the flag N=3. In FIG. 5C, in addition to the LV image 500R, the LV image 500L, and the information indications 501a to 501c, 502a, and 502b, an information indication 503, which is a histogram of an LV image currently captured, is displayed. The information indication 503 is a graph with the brightness incremented on the horizontal axis and the number of pixels incremented on the vertical axis, and serves as a target for checking how degree of brightness an LV image currently captured has or checking the tendency of exposure level or the gradation of the whole LV image. Since some users may want to check the information indication 503 at the time of performing image capturing, the information indication 503 is displayed. On the other hand, since the information indication 503 is displayed in a relatively large area in an LV image, the visibility of the LV image may decrease. In response to the display mode switching button 83 being pressed in the state illustrated in FIG. 5C, a transition to displaying illustrated in FIG. 5D occurs.

Figure 5D:
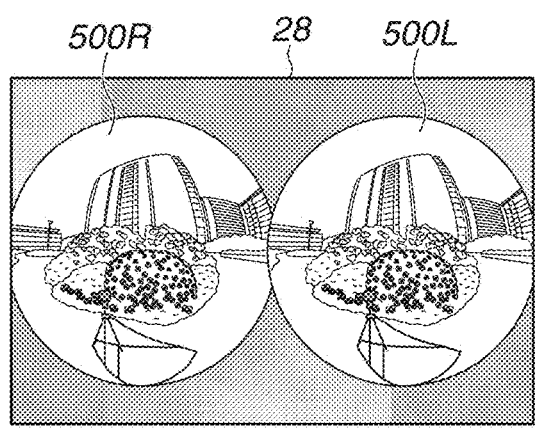

FIG. 5D illustrates a display mode which is used when the flag N=4. In the display mode illustrated in FIG. 5D, all of the information indications 501a to 501c, 502a, 502b, and 503 are hidden, and only the LV image 500R and the LV image 500L are displayed. Performing such displaying enables the user to perform image capturing while viewing only LV images without feeling various pieces of image capturing information to be cumbersome. In response to the display mode switching button 83 being pressed in the state illustrated in FIG. 5D, a transition to displaying illustrated in FIG. 5E occurs.

Figure 5E:
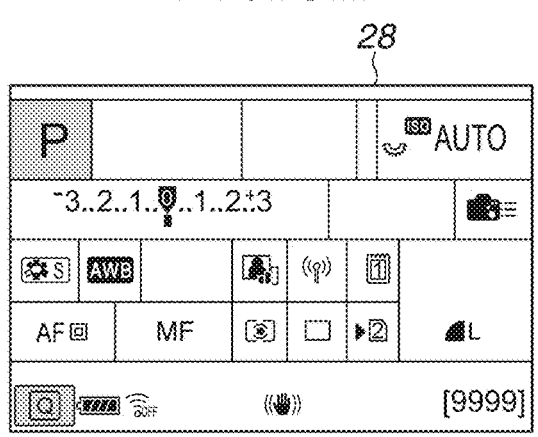
Figure 5F:
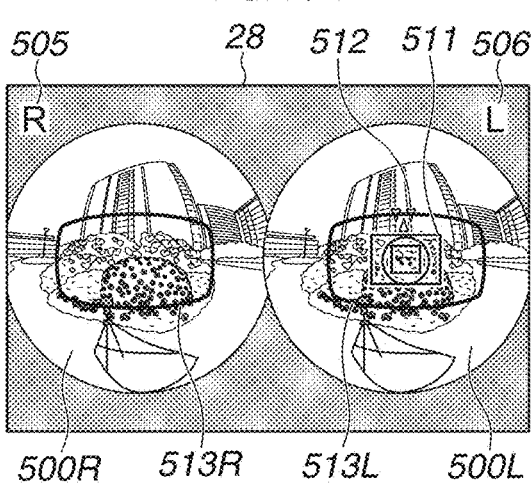

FIG. 5E illustrates a display mode which is used when the flag N=5. In the display mode illustrated in FIG. 5E, no LV image is displayed, and only information indications concerning image capturing are displayed in a table-like form. In response to the display mode switching button 83 being pressed in the state illustrated in FIG. 5E, in a case where a dual lens is mounted, a transition to displaying illustrated in FIG. 5F occurs, and, in a case where a single lens is mounted or no lens is mounted, a transition to displaying illustrated in FIG. 5A occurs.

FIG. 5F illustrates a display mode which is used when the flag N=6 (step S407 in FIG. 4). Thus, the display mode illustrated in FIG. 5F is a display mode a transition to which occurs only in a case where a dual lens is mounted on the digital camera 100. At this time, the LV image 500R, the LV image 500L, the information indications 505 and 506 are displayed on the display unit 28, and an enlargement frame 511, a focus guide 512, and magic windows 513 are also displayed thereon in superimposition on LV images. The information indication 505 indicates that the LV image 500R is an LV image captured by the right eye optical system 301R, and is displayed as "R", which means right. The information indication 506 indicates that the LV image 500L is an LV image captured by the left eye optical system 301L, and is displayed as "L", which means left.

Originally, in the case of an optical system such as that for use in the digital camera 100, an image captured by an image sensor (imaging unit 22) is an image captured upside down. Up and down sides of such an image captured upside down are inverted by 180 degrees, so that the inverted image is displayed on the display unit 28 or the EVF 29. In light of such a structure, suppose that image capturing is performed with use of a lens including two optical systems such as that illustrated in FIG. 3 (dual lens). As mentioned above, if two LV images captured via left and right optical systems and input to the imaging unit 22 are displayed on the display unit 28 without being subjected to inversion processing, LV images inverted upside down are displayed, so that the user may feel inconvenience. Therefore, as with a case where a single lens is mounted, inversion processing is performed on two LV images input to the imaging unit 22.

However, even if inversion processing is performed, with regard to two LV images which are displayed on the display unit 28, an LV image (right image) acquired via the right eye optical system 301R is displayed in the left region and an LV image (left image) acquired via the left eye optical system 301L is displayed in the right region. Particularly, since, in the present exemplary embodiment, image capturing is performed with a single image sensor (imaging unit 22), processing for determining a boundary between two LV images on the single image sensor and reversing left and right LV images increases processing load in the system control unit 50. Therefore, LV images input to the imaging unit 22 are inverted upside down by 180 degrees and are then displayed on the display unit 28 without being subjected to left and right reversing.

In a case where two LV images are displayed on the display unit 28, the user usually thinks that an LV image displayed in the left region is an image captured via the left eye optical system 301L and an LV image displayed in the right region is an image captured via the right eye optical system 301R. Thus, unless the information indications 505 and 506 are displayed, the user has a high probability of being unable to understand that left and right LV images have been inverted between left and right, and, if the user does not have an awareness that inversion between left and right occurs at the time of image capturing, the user may become confused. Therefore, displaying the information indications 505 and 506 enables the user to clearly visually recognize an image captured via which of the left and right optical systems each LV image is.

The enlargement frame 511, which is displayed in superimposition on an LV image, is a frame indication indicating a region to be enlarged in the LV image when an enlargement instruction (described below in step S801 in FIG. 8A) has been issued by the user. The focus guide 512 is an indicator indicating, with an index and information about, for example, color, a frame representing a focus detection area and a degree of in-focus in focusing on a subject at a position where the focus detection area is displayed in a superimposed manner. In the present exemplary embodiment, the degree of in-focus in focusing is expressed by three indexes displayed above or below the focus detection area. The focus guide 512 illustrated in FIG. 5F enables knowing that the degree of in-focus in focusing is out of focus on a subject at a position where the focus detection area is displayed and is far focus (a state in which focusing is adjusted to behind the subject and is not adjusted to the subject). Moreover, in a case where the degree of in-focus in focusing is not in focus, the focus guide 512 is displayed in white. Such three indexes becoming two indexes indicates that the degree of in-focus in focusing is in focus, so that the focus guide 512 is displayed in green.

The magic windows 513, which are displayed on the display unit 28, are indicators representing ranges which are displayed in the beginning before the user moves the user's point of view. The magic windows 513 represent ranges which are displayed in the beginning before the user moves the user's point of view, when one 180-degree image (hemispherical image) is generated from the LV image 500R and the LV image 500L and is then played back via a browser or a head-mounted display (HMD). Displaying the magic windows 513 in LV images enables the user to visually recognize, at the time of image capturing, a range which is displayed in the beginning at the time of playback, i.e., which a viewing person sees for the first time, and enables more effectively performing image capturing of a composition or subject desired by the user.

In one embodiment, the magic windows 513 are indicators which become necessary only when a 180-degree image has been generated, and are specific indicators which the user particularly needs when performing image capturing with a dual lens mounted. Therefore, the display mode illustrated in FIG. 5F is not displayed when a single lens is mounted. Moreover, since the display positions of the magic windows 513 are fixed, as long as the user is able to check the ranges of the magic windows 513, the magic windows 513 do not necessarily need to be always displayed at the time of subsequent image capturing.

Furthermore, in the present exemplary embodiment, the enlargement frame 511 and the focus guide 512 are displayed in a superimposed manner in only one LV image out of the two LV images, and the magic windows 513 are displayed in a superimposed manner in both of the two LV images. While, since the enlargement frame 511 indicates a position at which to perform enlargement, displaying only one enlargement frame is thought to be optimal, the focus guide 512 can be configured to be displayed not in one LV image but in both of the two LV images.

In step S410, as with step S404, the system control unit 50 determines whether the lens mounted via the communication terminal groups 6 and 10 is a dual lens. If it is determined that the mounted lens is a dual lens (YES in step S410), the system control unit 50 advances the processing to step S411, and, if not so (NO in step S410), the system control unit 50 advances the processing to step S412.

In step S411, the system control unit 50 calculates the centers and sizes of a left image and a right image from lens information acquired via the communication terminal groups 6 and 10. The method of calculation at this time is described with reference to FIG. 12.

Figure 12:
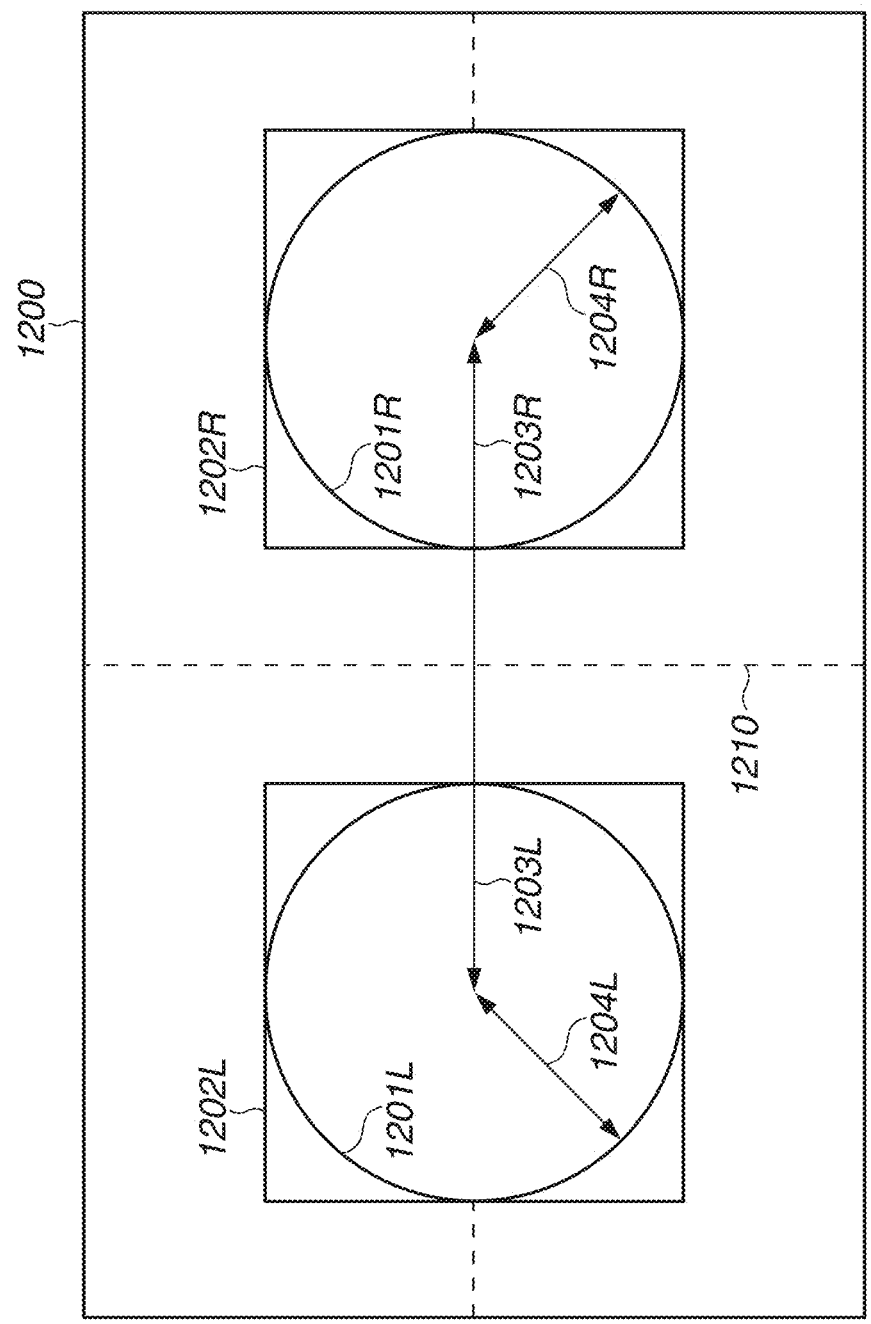
FIG. 12 is a diagram illustrating an example of a physical coordinate system for optical images acquired by an imaging unit of the camera with the dual lens mounted thereon.

FIG. 12 is a diagram illustrating a physical coordinate system 1200 for optical images formed on the imaging unit 22 (image sensor) of the digital camera 100 in the present exemplary embodiment. The coordinate system 1200 corresponds to a case where the imaging unit 22 is viewed from the side of the lens unit 300.

In the present exemplary embodiment, a circular optical image 1201R formed by the left eye optical system 301L and a circular optical image 1201L formed by the right eye optical system 301R are formed on a single image sensor. Moreover, the imaging unit 22 converts the formed subject images into analog electrical signals, thus forming a logical coordinate system 1300 illustrated in FIG. 13.

The system control unit 50 is able to acquire pieces of information such as those described below from the lens mounted via the communication terminal groups 6 and 10.

For example, the system control unit 50 is able to acquire a distance 1203R between the center line 1210 of the image sensor 1200 and the center position of the circular optical image 1201R and a distance 1203L between the center line 1210 of the image sensor 1200 and the center position of the circular optical image 1201L. Moreover, the system control unit 50 is able to acquire a radius 1204R of the optical image 1201R and a radius 1204L of the optical image 1201L.

Figure 13:
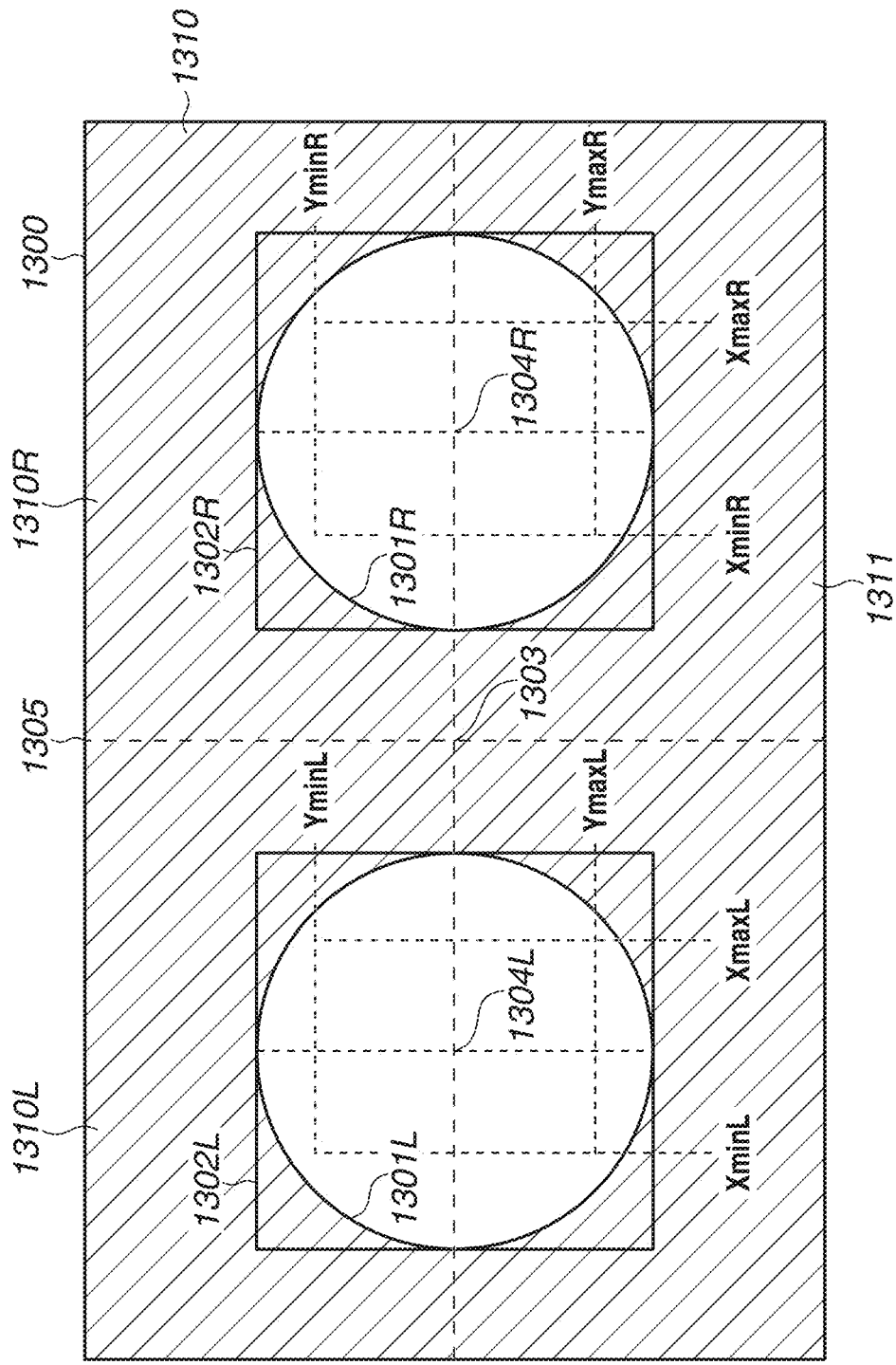
FIG. 13 is a diagram illustrating a logical coordinate system converted from a physical coordinate system for optical images acquired by the imaging unit of the camera with the dual lens mounted thereon.

The system control unit 50 is able to calculate, from the thus-acquired lens information, the centers and sizes of two LV images (a left image and a right image) acquired via two optical systems, such as those illustrated in FIG. 13.

Next, processing which is performed when a touch-down operation on the touch panel 70a has been performed is described. In response to touch-down on the touch panel 70a having been performed during displaying of images, the system control unit 50 of the digital camera 100 displays, in an image, an item concerning focus control and an item indicating an enlargement range. In a case where the lens unit mounted on the digital camera 100 is not a dual lens (is a conventional single lens), the system control unit 50 displays, at a position corresponding to touch-down, a focus guide indicating the degree of in-focus or an autofocus (AF) frame indicating a region targeted for autofocus. Moreover, in a case where the lens unit mounted on the digital camera 100 is a dual lens, in response to touch-down, the system control unit 50 displays a focus guide indicating the degree of in-focus at the center of any one of a region used for displaying a left image and a region used for displaying a right image. Additionally, the system control unit 50 displays an enlargement frame indicating an enlargement range at a position corresponding to touch-down. In a case where the lens unit mounted on the digital camera 100 is a dual lens, the system control unit 50 performs displaying in such a manner that the enlargement frame includes regions in which optical images of the left image and the right image are formed (does not include only a hatched portion which includes neither the left image nor the right image).

In step S412, the system control unit 50 determines whether a touch-down operation on the touch panel 70a has been performed. If it is determined that the touch-down operation has been performed (YES in step S412), the system control unit 50 stores coordinates (xt, yt) indicating the touch-down position (touch position) and then advances the processing to step S413, and, if not so (NO in step S412), the system control unit 50 advances the processing to step S601 illustrated in FIG. 6.

In step S413, as with step S404, the system control unit 50 determines whether the lens mounted via the communication terminal groups 6 and 10 is a dual lens. If it is determined that the mounted lens is a dual lens (YES in step S413), the system control unit 50 advances the processing to step S414, and, if not so (NO in step S413), the system control unit 50 advances the processing to step S419.

Figure 7A:
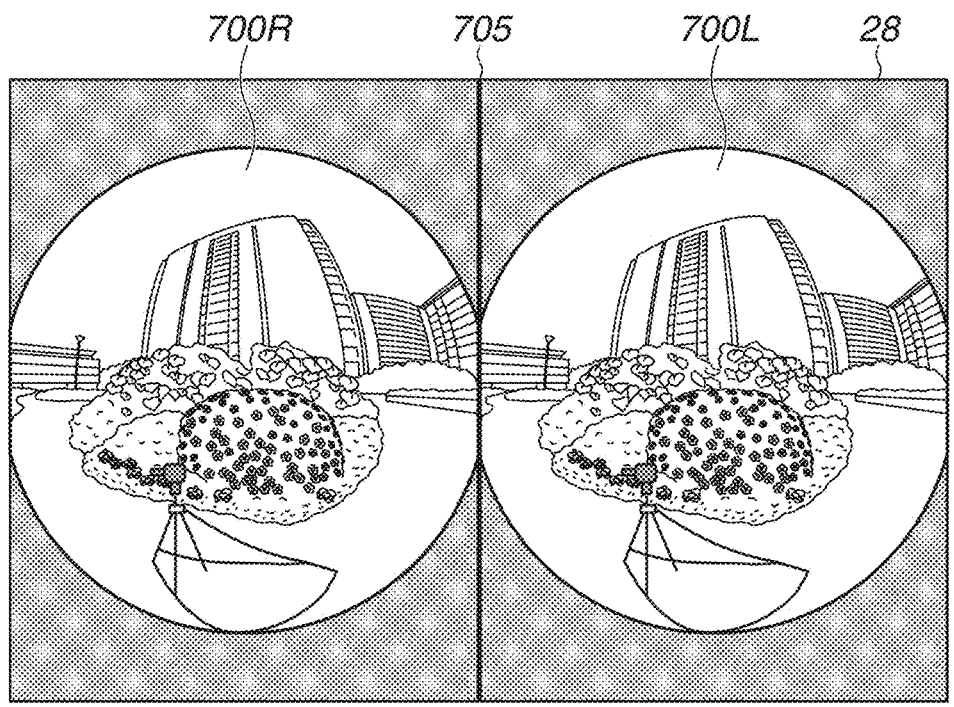
FIGS. 7A and 7B are diagrams used to explain a boundary between a left live view and a right live view in the camera with the dual lens mounted thereon.
Figure 7B:
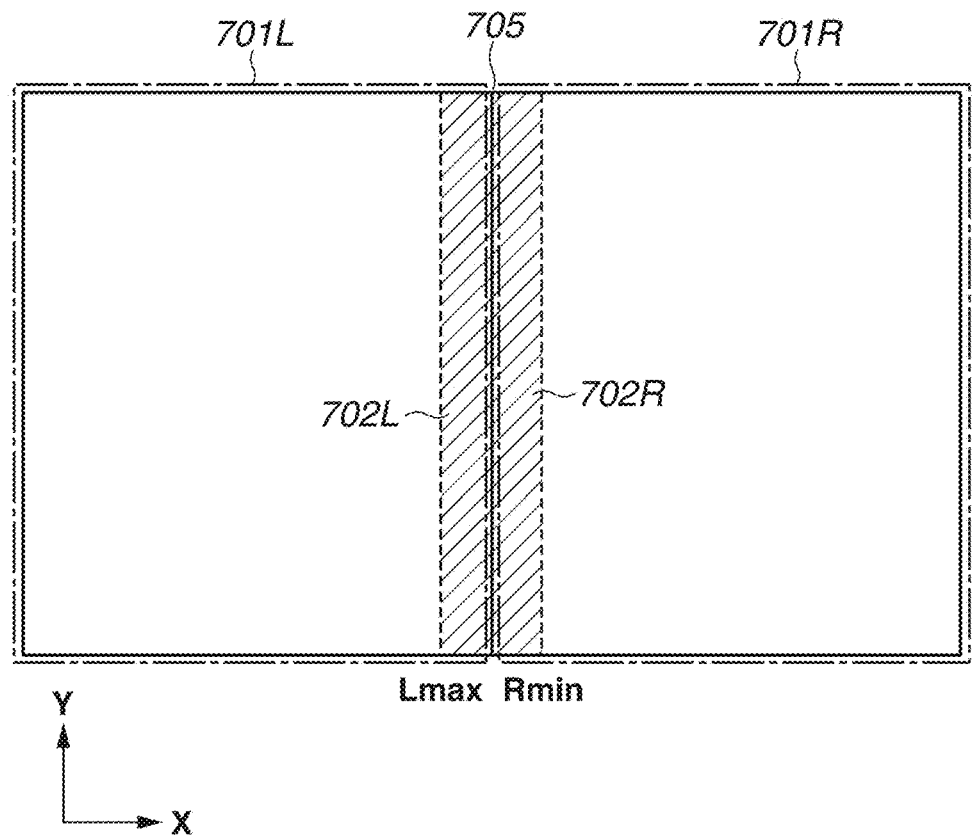

In step S414, the system control unit 50 determines whether the touch position (touch-down position) of a touch operation on the touch panel 70a performed in step S412 is within a left-side region (region 701L) of the dual-lens image. FIGS. 7A and 7B are schematic diagrams illustrating an example of display in which a dual-lens image is shown. If it is determined that the touch position is within a left region (within the region 701L) (YES in step S414), the system control unit 50 advances the processing to step S415, and, if it is determined that the touch position is within a right region (within a region 701R) (NO in step S414), the system control unit 50 advances the processing to step S417. A line 705 is a line serving just as a boundary between live view images (an LV image 700R and an LV image 700L) respectively captured via the right and left optical systems. Furthermore, in the present exemplary embodiment, the line 705 is a center line along which the imaging unit 22 is assumed to be divided into halves right and left.

In step S415, the system control unit 50 displays the focus guide at the center of the left region.

In a case where, at this time, the focus guide is already displayed in any of LV images in the left region and right region in superimposition on the LV image, the system control unit 50 moves the focus guide to the center of the left region (the center of an LV image captured via the right eye optical system 301R and displayed in the left region). The focus guide is composed of a frame indicating a focus detection area and a plurality of indexes indicating the degree of in-focus with a relationship between display positions thereof. The display positional relationship of indexes enables the user to visually recognize whether an in-focus state is obtained at a display position of the focus detection area, how much an out-of-focus state is, and, in the case of an out-of-focus state, at which of the near and far sides with respect to a subject in the focus detection area, the out-of-focus state is. Furthermore, the focus guide is not limited to such a display form, but can indicate the degree of in-focus with, for example, color.

In step S416, the system control unit 50 performs position calculation processing (left region) for the enlargement frame by a touch operation. This processing is described below with reference to FIG. 10A.

In step S417, since a result of the determination in step S414 is NO, the system control unit 50 displays the focus guide at the center of the right region (the center of an LV image captured via the left eye optical system 301L and displayed in the right region). In a case where, at this time, the focus guide is already displayed in superimposition on the LV image, the system control unit 50 moves the focus guide to the center of the right region. An example of displaying performed at this time is shown as the guide 512 illustrated in FIG. 5F.

In step S418, the system control unit 50 performs position calculation processing (right region) for the enlargement frame by a touch operation. This processing is described below with reference to FIG. 10B.

Figure 10A:
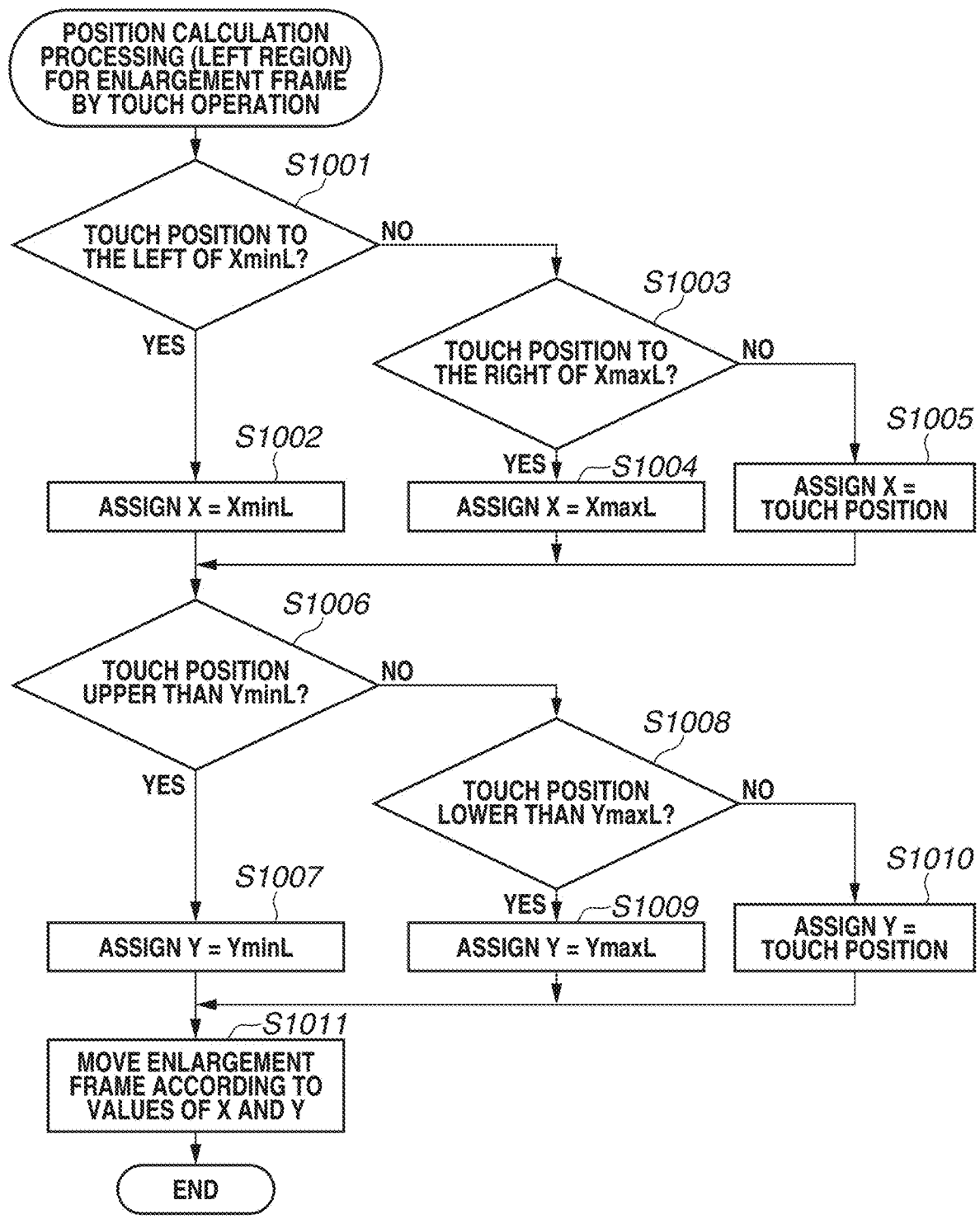
FIGS. 10A and 10B are control flowcharts concerning a calculation method for the movement and display position of an enlargement frame at the time of a touch-down operation.
Figure 10B:
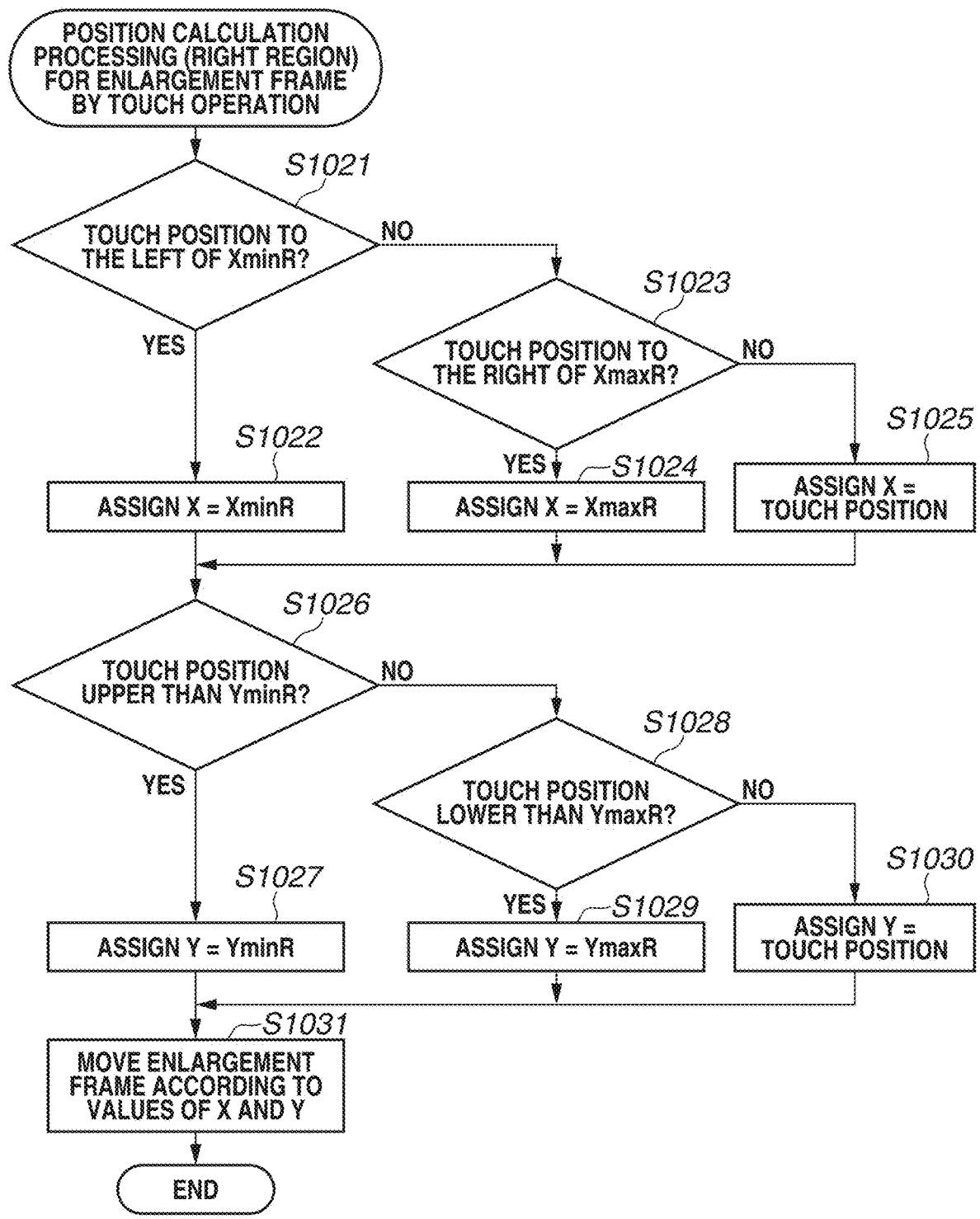

FIGS. 10A and 10B are control flowcharts illustrating processing for calculating the position of the enlargement frame in a case where a touch-down operation on the touch panel 70a has been performed by the user, in steps S416 and S418, respectively, illustrated in FIG. 4. The system control unit 50 determines whether the position of touch-down performed by the user is within a specific range out of the left and right regions, and, if the touch-down position is within the specific range, moves displaying of the enlargement frame to the touch-down position and, if the touch-down position is outside the specific range, moves displaying of the enlargement frame to within a specific range closest to the touch-down position. The specific range mentioned herein is assumed to be a range in which the display range of the left image or the right image is included. XminL, XmaxL, YminL, and YmaxL denote coordinates representing threshold values of a range in which the center of the enlargement frame is movable in the left region. XminR, XmaxR, YminR, and YmaxR denote coordinates representing threshold values of a range in which the center of the enlargement frame is movable in the right region. Details of this coordinate system are described below with reference to FIG. 13.

Calculation processing which is performed in a case where the touch position (the position of touch-down performed in step S412) is within the left region is described with reference to FIG. 10A. The left region mentioned herein refers to a region 1310L illustrated in FIG. 13. Furthermore, the region 1310L is the same region as the region 701L illustrated in FIG. 7B.

In step S1001, the system control unit 50 determines whether the touch position is to the left of XminL (illustrated in FIG. 13). If it is determined that the touch position is to the left of XminL (YES in step S1001), the system control unit 50 advances the processing to step S1002, and, if not so (NO in step S1001), the system control unit 50 advances the processing to step S1003.

In step S1002, the system control unit 50 sets the X coordinate of the center of the enlargement frame to X=XminL and then stores the set X coordinate in the system memory 52.

In step S1003, the system control unit 50 determines whether the touch position (the position of touch-down performed in step S412) is to the right of XmaxL. If it is determined that the touch position is to the right of XmaxL (YES in step S1003), the system control unit 50 advances the processing to step S1004, and, if not so (NO in step S1003), the system control unit 50 advances the processing to step S1005.

In step S1004, the system control unit 50 sets the X coordinate of the center of the enlargement frame to X=XmaxL and then stores the set X coordinate in the system memory 52.

In step S1005, the system control unit 50 sets the X coordinate of the center of the enlargement frame to X=xt of the touch position and then stores the set X coordinate in the system memory 52.

In step S1006, the system control unit 50 determines whether the touch position is upper than YminL If it is determined that the touch position is upper than YminL (YES in step S1006), the system control unit 50 advances the processing to step S1007, and, if not so (NO in step S1006), the system control unit 50 advances the processing to step S1008.

In step S1007, the system control unit 50 sets the Y coordinate of the center of the enlargement frame to Y=YminL and then stores the set Y coordinate in the system memory 52.

In step S1008, the system control unit 50 determines whether the touch position is lower than YmaxL. If it is determined that the touch position is lower than YmaxL (YES in step S1008), the system control unit 50 advances the processing to step S1009, and, if not so (NO in step S1008), the system control unit 50 advances the processing to step S1010.

In step S1009, the system control unit 50 sets the Y coordinate of the center of the enlargement frame to Y=YmaxL and then stores the set Y coordinate in the system memory 52.

In step S1010, the system control unit 50 sets the Y coordinate of the center of the enlargement frame to Y=yt of the touch position and then stores the set Y coordinate in the system memory 52.

In step S1011, the system control unit 50 moves the enlargement frame according to the values of the X and Y coordinates stored in the system memory 52. At this time, the system control unit 50 moves the display position in such a manner that the center of vertical and horizontal sides of the enlargement frame becomes coincident with the stored values of the X and Y coordinates.

Similarly, calculation processing which is performed in a case where the touch position (the position of touch-down performed in step S412) is within the right region is described with reference to FIG. 10B. The right region mentioned herein refers to a region 1310R illustrated in FIG. 13. Furthermore, the region 1310R is the same region as the region 701R illustrated in FIG. 7B.

In step S1021, the system control unit 50 determines whether the touch position is to the left of XminR (illustrated in FIG. 13). If it is determined that the touch position is to the left of XminR (YES in step S1021), the system control unit 50 advances the processing to step S1022, and, if not so (NO in step S1021), the system control unit 50 advances the processing to step S1023.

In step S1022, the system control unit 50 sets the X coordinate of the center of the enlargement frame to X=XminR and then stores the set X coordinate in the system memory 52.

In step S1023, the system control unit 50 determines whether the touch position is to the right of XmaxR (illustrated in FIG. 13). If it is determined that the touch position is to the right of XmaxR (YES in step S1023), the system control unit 50 advances the processing to step S1024, and, if not so (NO in step S1023), the system control unit 50 advances the processing to step S1025.

In step S1024, the system control unit 50 sets the X coordinate of the center of the enlargement frame to X=XmaxR and then stores the set X coordinate in the system memory 52.

In step S1025, the system control unit 50 sets the X coordinate of the center of the enlargement frame to X=xt of the touch position and then stores the set X coordinate in the system memory 52.

In step S1026, the system control unit 50 determines whether the touch position is upper than YminR (illustrated in FIG. 13). If it is determined that the touch position is upper than YminR (YES in step S1026), the system control unit 50 advances the processing to step S1027, and, if not so (NO in step S1026), the system control unit 50 advances the processing to step S1028.

In step S1027, the system control unit 50 sets the Y coordinate of the center of the enlargement frame to Y=YminR and then stores the set Y coordinate in the system memory 52.

In step S1028, the system control unit 50 determines whether the touch position is lower than YmaxR (illustrated in FIG. 13). If it is determined that the touch position is lower than YmaxR (YES in step S1028), the system control unit 50 advances the processing to step S1029, and, if not so (NO in step S1028), the system control unit 50 advances the processing to step S1030.

In step S1029, the system control unit 50 sets the Y coordinate of the center of the enlargement frame to Y=YmaxR and then stores the set Y coordinate in the system memory 52.

In step S1030, the system control unit 50 sets the Y coordinate of the center of the enlargement frame to Y=yt of the touch position and then stores the set Y coordinate in the system memory 52.

In step S1031, the system control unit 50 moves the enlargement frame according to the values of the X and Y coordinates stored in the system memory 52. At this time, the system control unit 50 moves the display position in such a manner that the center of vertical and horizontal sides of the enlargement frame becomes coincident with the stored values of the X and Y coordinates.

Performing the above-described control prevents the movement of the enlargement frame due to a touch operation performed by the user from being performed to a region in which neither the left image nor the right image is displayed (no optical image is formed). Thus, even if a touch operation (touch-down) by the user has been performed on a region in which no optical image is formed (a region 1311 illustrated in FIG. 13), the entire target range included in the enlargement frame is prevented from becoming a region in which no optical image is formed. At this time, the enlargement frame is moved in such a way as to include at least a part of a region in which the left image or the right image is displayed (a circular region 1301L or a circular region 1301R illustrated in FIG. 13). With this movement, in a case where the user has issued an enlargement instruction, enlargement displaying in which at least the left image or the right image is included is performed on the display unit 28. Since only enlargement displaying of a portion in which neither the left image nor the right image is included at all (the region 1311 in which no optical image is formed) being performed on the display unit 28 is prevented, it is possible to reduce the user from becoming confused or feeling that operability is low.

Next, control which is performed in response to touch-down in a case where the lens mounted on the digital camera 100 is not a dual lens (is a single lens) is described.

In step S419, the system control unit 50 refers to the non-volatile memory 56 and determines whether the setting of a focus mode is an autofocus mode (AF mode) or a manual focus mode (MF mode). If it is determined that the setting of a focus mode is the MF mode (MF in step S419), the system control unit 50 advances the processing to step S420, and, if it is determined that the setting of a focus mode is the AF mode (AF in step S419), the system control unit 50 advances the processing to step S421. In a case where the display setting of the focus guide is ON when the setting of a focus mode is the MF mode, the system control unit 50 displays the focus guide to assist in focus adjustment in the MF operation.

In step S420, the system control unit 50 moves displaying of the focus guide to the touch position designated by the user in step S412.

In step S421, the system control unit 50 displays an autofocus frame (AF frame), which indicates an in-focus position, at the touch position designated by the user in step S412.

In step S422, the system control unit 50 displays the enlargement frame at the touch position designated by the user in step S412.

Thus, in a case where the lens mounted on the digital camera 100 is not a dual lens (is a single lens), irrespective of the setting content of a focus mode, the enlargement frame or the focus guide is displayed at the touch position designated by the user. Moreover, the enlargement frame is displayed in conjunction with a focus detection area of the AF frame or the focus guide. On the other hand, in a case where a dual lens is mounted, the display position of the enlargement frame is not moved in conjunction with a focus detection area of the focus guide.

In the present exemplary embodiment, the display position of the focus guide in a case where a dual lens is mounted is fixed to the center of a display region for each of left and right LV images. Therefore, if the display position of the focus guide and the display position of the enlargement frame are moved in conjunction with each other, only the center of the LV image is able to be enlarged, so that the usability for the user is low. Moreover, since, in the case of a dual lens, two LV images are displayed on the display unit 28, every single LV image becomes half or less in size as compared with an LV image obtained at the time of mounting of a single lens. Therefore, the user has a high probability of checking an LV image in more detail by enlarging the LV image a larger number of times than at the time of mounting of a single lens. Therefore, to enable the user to freely check the desired position, the enlargement frame (i.e., an enlargement range for the LV image) is not moved in conjunction with the focus guide.

Furthermore, even in a case where the focus guide is not fixed to the center, when a dual lens is mounted, the focus guide and the enlargement frame are made not to be moved in conjunction with each other. While the user performs more rigorous focus adjustment with use of the focus guide, a case where the user wants to enlarge a position different from a position targeted for focusing and then check the enlarged position in more detail is assumable. For example, in a case where the user wants to enlarge and check the inside of a range of the magic window described below or a region near the circumference of an LV image as a circular fisheye view, causing the positions of the focus guide and the enlargement frame not to be moved in conjunction with each other is beneficial for operability for the user.

Figure 6:
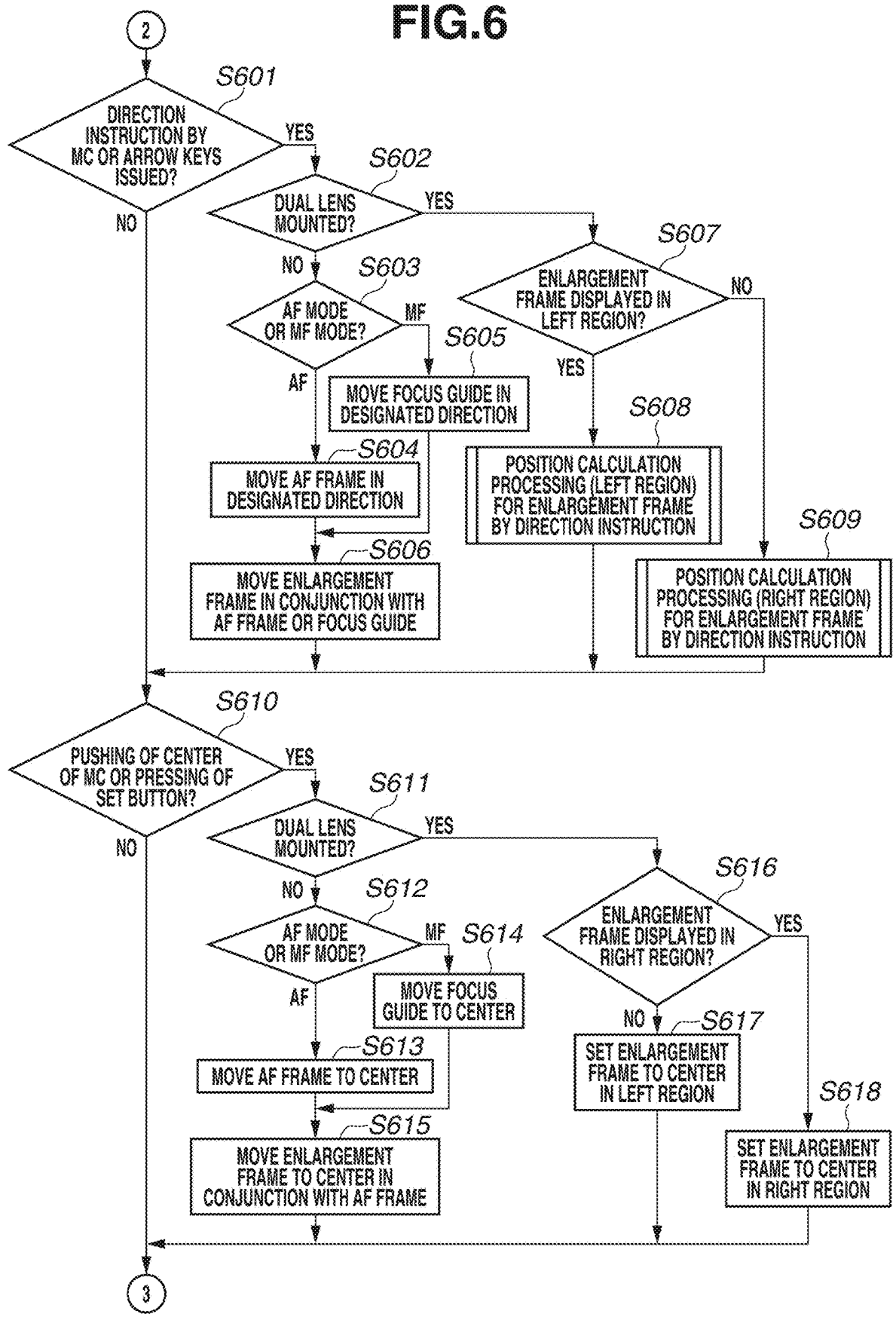
FIG. 6 is a control flowchart concerning movement of an enlargement frame in the camera with the dual lens mounted thereon.

FIG. 6 is a control flowchart illustrating display control for the digital camera 100 when an operation has been performed on an operation member capable of issuing a direction instruction in the present exemplary embodiment.

In response to receiving a direction instruction during displaying of a dual-lens image and an item such as the enlargement frame, the system control unit 50 of the digital camera 100 moves the position of the item in the image. In a case where the lens unit mounted on the digital camera 100 is not a dual lens (is a conventional single lens), the system control unit 50 moves the focus guide or the AF frame and the enlargement frame according to the direction instruction.

Moreover, in a case where the lens unit mounted on the digital camera 100 is a dual lens, the system control unit 50 moves the enlargement frame according to the direction instruction. Furthermore, the system control unit 50 does not move the focus guide. Additionally, in a state in which the enlargement frame is displayed in the right region on the display unit 28 and near the boundary in such a manner that the enlargement frame does not include both the left image and the right image, in response to receiving an instruction for a leftward direction, the system control unit 50 moves the display position of the enlargement frame to the left region. In a state in which the enlargement frame is displayed in the left region on the display unit 28 and near the boundary in such a manner that the enlargement frame does not include both the left image and the right image, in response to receiving an instruction for a rightward direction, the system control unit 50 moves the display position of the enlargement frame to the right region.

In step S601, the system control unit 50 determines whether a direction instruction by the multi-controller (MC) 82 or the arrow keys 74 included in the operation unit 70 has been issued. If it is determined that the direction instruction has been issued (YES in step S601), the system control unit 50 advances the processing to step S602, and, if not so (NO in step S601), the system control unit 50 advances the processing to step S610.

In step S602, as with step S413, the system control unit 50 acquires the type of the lens mounted via the communication terminal group 6 and 10 and determines whether the mounted lens is a dual lens. If it is determined that the mounted lens is a dual lens (YES in step S602), the system control unit 50 advances the processing to step S607, and, if not so (NO in step S602), the system control unit 50 advances the processing to step S603.

In step S603, as with step S419, the system control unit 50 determines whether the current focus mode of the digital camera 100 is the AF mode or the MF mode. If it is determined that the current focus mode is the AF mode (AF in step S603), the system control unit 50 advances the processing to step S604, and if it is determined that the current focus mode is the MF mode (MF in step S603), the system control unit 50 advances the processing to step S605. Furthermore, in a case where, at the time of the MF mode, display setting of the focus guide for assisting in MF focus adjustment is ON, the system control unit 50 displays the focus guide in any one of LV images displayed on the display unit 28. If a touch-down operation on the touch panel 70*a* as mentioned above in step S412 has not still been performed, the system control unit 50 displays the focus guide in superimposition on an LV image in the right region.

In step S604, the system control unit 50 moves the AF frame displayed on the display unit 28 in a direction designated in step S601.

In step S605, the system control unit 50 moves the focus guide displayed on the display unit 28 in a direction designated in step S601. In a case where display setting of the focus guide is set to OFF by the user setting, the system control unit 50 skips step S605. At this time, the system control unit 50 moves the entire focus guide, but can move not the entire focus guide but only the focus detection area.

In step S606, the system control unit 50 moves the enlargement frame displayed on the display unit 28 in conjunction with the AF frame or the focus guide to the position of the AF frame moved in step S604 or the position of a frame indicating the focus detection area of the focus guide moved in step S605.

In step S607, the system control unit 50 determines whether the currently displayed enlargement frame is displayed in the left region. If it is determined that the currently displayed enlargement frame is displayed in the left region (YES in step S607), the system control unit 50 advances the processing to step S608, and, if not so, i.e., if it is determined that the currently displayed enlargement frame is displayed in the right region (NO in step S607), the system control unit 50 advances the processing to step S609. At this time, the system control unit 50 determines whether the entire enlargement frame is displayed in the left region. Thus, the system control unit 50 determines whether the coordinates of the center position of the enlargement frame is at least in the region 1310L.

In step S608, the system control unit 50 performs position calculation processing for the enlargement frame (left region) by the direction instruction. This processing is described below with reference to FIG. 11A.

In step S609, the system control unit 50 performs position calculation processing for the enlargement frame (right region) by the direction instruction. This processing is described below with reference to FIG. 11B.

Figure 11A:
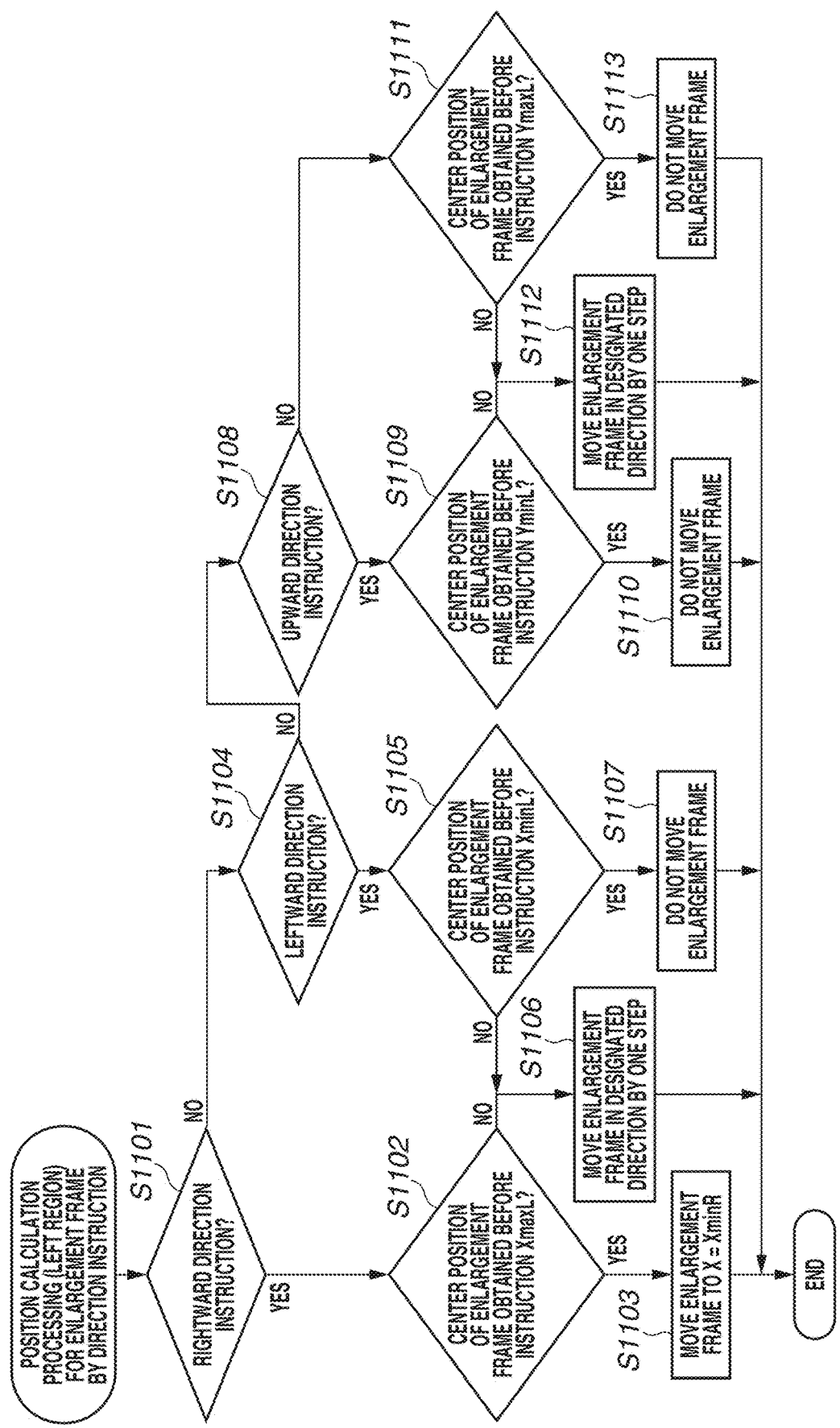
FIGS. 11A and 11B are control flowcharts concerning a calculation method for the movement and display position of an enlargement frame at the time of a direction instruction being issued.
Figure 11B:
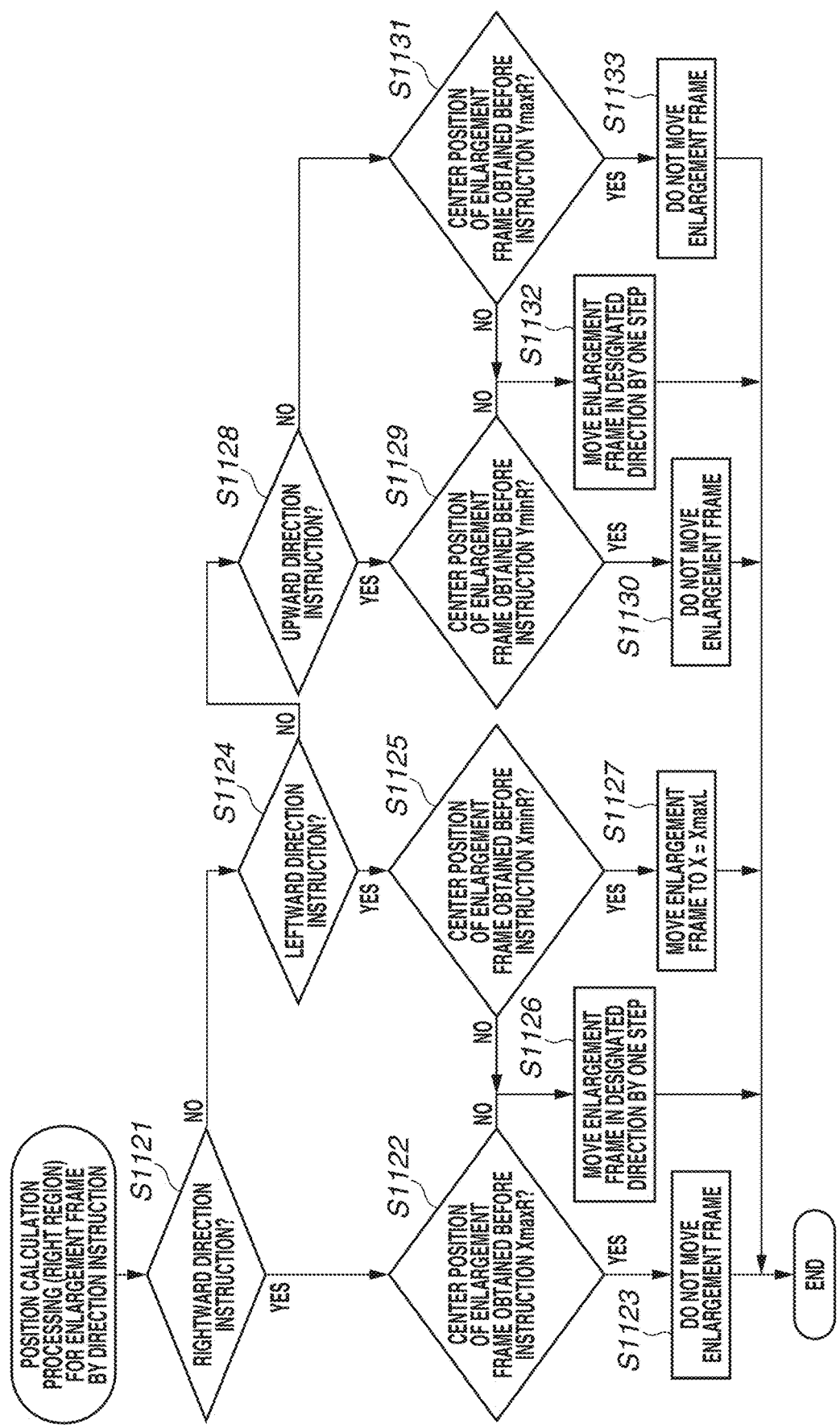

FIGS. 11A and 11B are control flowcharts illustrating processing for calculating the position of the enlargement frame which is displayed in a case where a direction instruction has been issued by the user via the multi-controller (MC) 82 or the arrow keys 74, in steps S608 and S609, respectively, illustrated in FIG. 6. The system control unit 50 determines whether the display position of the currently displayed enlargement frame (the central coordinate position of the enlargement frame) is on a side inner than a specific range in the left and right regions. In a case where the display position is on a side inner than the specific range, the system control unit 50 moves the enlargement frame by one step in a direction designated by the user instruction. In a case where the central coordinate position of the enlargement frame is on a boundary of the specific range in the left and right regions, the system control unit 50 performs control depending on the direction designated by the direction instruction, for example, in such a way as prevent the enlargement frame from being moved or in such a way as to cause the enlargement frame to jump from one optical image to the other optical image (e.g., from the left image to the right image). The specific range mentioned herein is the same as the specific range mentioned above in FIGS. 10A and 10B and is assumed to be within a rectangular range in which the display range of the left image or the right image is included. A coordinate system which is used for determination at this time is described below with reference to FIG. 13.

Calculation processing which is performed in a case where the display region of the enlargement frame which has been displayed before a movement instruction (direction instruction) for the enlargement frame is issued is a left region is described with reference to FIG. 11A. The left region mentioned herein refers to the region 1310L illustrated in FIG. 13.

In step S1101, the system control unit 50 determines whether the direction instruction is a rightward direction instruction. The instruction in this step refers to an instruction issued by the user via the MC 82 or the arrow keys 74 in step S601 illustrated in FIG. 6. If it is determined that the direction instruction is a rightward direction instruction (YES in step S1101), the system control unit 50 advances the processing to step S1102, and, if not so (NO in step S1101), the system control unit 50 advances the processing to step S1104.

In step S1102, the system control unit 50 determines whether the X coordinate of the center of the enlargement frame obtained before the instruction is received is X=XmaxL. If so (YES in step S1102), the system control unit 50 advances the processing to step S1103, and, if not so (NO in step S1102), the system control unit 50 advances the processing to step S1106.

In step S1103, the system control unit 50 moves the enlargement frame in such a manner that the X coordinate of the center of the enlargement frame becomes X=XminR.

In step S1104, the system control unit 50 determines whether the direction instruction is a leftward direction instruction. If it is determined that the direction instruction is a leftward direction instruction (YES in step S1104), the system control unit 50 advances the processing to step S1105, and, if not so (NO in step S1104), the system control unit 50 advances the processing to step S1108.

In step S1105, the system control unit 50 determines whether the X coordinate of the center of the enlargement frame obtained before the instruction is received is X=XminL If so (YES in step S1105), the system control unit 50 advances the processing to step S1107, and, if not so (NO in step S1105), the system control unit 50 advances the processing to step S1106.

In step S1106, the system control unit 50 moves the display position of the enlargement frame in the direction designated by the direction instruction. At this time, the amount of movement by which the display position moves according to one occurrence of a direction instruction is assumed to be an amount corresponding to one pixel of the display unit 28.

In step S1107, the system control unit 50 does not move the enlargement frame. A result of the determination in step S1105 being YES reveals that the left side of the enlargement frame which is displayed before a direction instruction is issued by the user is inscribed in a rectangle 1302L illustrated in FIG. 13. If, in response to an instruction for a leftward direction being issued in such a state, the enlargement frame is moved a distance corresponding to one pixel in a leftward direction, a region in which no optical image is formed (region 1311) becomes included in an enlargement range indicated by the enlargement frame (a range targeted for enlargement). If such control is performed, many portions other than the left image or the right image may be displayed in an enlarged display image displayed on the display unit 28, so that the user may feel that usability is low. Therefore, the system control unit 50 keeps the enlargement frame from moving to outside the rectangle 1302L circumscribed around the circular region 1301L, in which the left image is displayed, in other words, keeps the enlargement range indicated by the enlargement frame from including outside the range of the rectangle 1302L.

In step S1108, the system control unit 50 determines whether the direction instruction is an upward direction instruction. If it is determined that the direction instruction is an upward direction instruction (YES in step S1108), the system control unit 50 advances the processing to step S1109, and, if not so (NO in step S1108), the system control unit 50 advances the processing to step S1111.

In step S1109, the system control unit 50 determines whether the Y coordinate of the center of the enlargement frame obtained before the instruction is received is Y=YminL If so (YES in step S1109), the system control unit 50 advances the processing to step S1110, and, if not so (NO in step S1109), the system control unit 50 advances the processing to step S1112.

In step S1110, the system control unit 50 does not move the enlargement frame. A result of the determination in step S1109 being YES reveals that the upper side of the enlargement frame which is displayed before a direction instruction is issued by the user is inscribed in the rectangle 1302L illustrated in FIG. 13. If, in response to an instruction for an upward direction being issued in such a state, the enlargement frame is moved a distance corresponding to one pixel in an upward direction, a region in which no optical image is formed (region 1311) becomes included in an enlargement range indicated by the enlargement frame (a range targeted for enlargement). As also mentioned above in step S1107, since, if such control is performed, the user may feel that usability is low, the system control unit 50 keeps the enlargement frame from including outside the range of the rectangle 1302L.

In step S1111, the system control unit 50 determines whether the Y coordinate of the center of the enlargement frame obtained before the instruction is received is Y=YmaxL. If so (YES in step S1111), the system control unit 50 advances the processing to step S1113, and, if not so (NO in step S1111), the system control unit 50 advances the processing to step S1112.

In step S1112, as with step S1106, the system control unit 50 moves the display position of the enlargement frame in the direction designated by the direction instruction. At this time, the amount of movement by which the display position moves according to one occurrence of a direction instruction is assumed to be an amount corresponding to one pixel of the display unit 28.

In step S1113, the system control unit 50 does not move the enlargement frame. A result of the determination in step S1111 being YES reveals that the lower side of the enlargement frame which is displayed before a direction instruction is issued by the user is inscribed in the rectangle 1302L illustrated in FIG. 13. If, in response to an instruction for a downward direction being issued in such a state, the enlargement frame is moved a distance corresponding to one pixel in a downward direction, a region in which no optical image is formed (region 1311) becomes included in an enlargement range indicated by the enlargement frame (a range targeted for enlargement). As also mentioned above in steps S1107 and S1110, since, if such control is performed, the user may feel that usability is low, the system control unit 50 keeps the enlargement frame from including outside the range of the rectangle 1302L.

Similarly, calculation processing which is performed in a case where the display region of the enlargement frame which has been displayed before a movement instruction (direction instruction) for the enlargement frame is issued is a right region is described with reference to FIG. 11B. The right region mentioned herein refers to the region 1310R illustrated in FIG. 13.

In step S1121, the system control unit 50 determines whether the direction instruction is a rightward direction instruction. The instruction in this step refers to an instruction issued by the user via the MC 82 or the arrow keys 74 in step S601 illustrated in FIG. 6. If it is determined that the direction instruction is a rightward direction instruction (YES in step S1121), the system control unit 50 advances the processing to step S1122, and, if not so (NO in step S1121), the system control unit 50 advances the processing to step S1124.

In step S1122, the system control unit 50 determines whether the X coordinate of the center of the enlargement frame obtained before the instruction is received is X=XmaxR. If so (YES in step S1122), the system control unit 50 advances the processing to step S1123, and, if not so (NO in step S1122), the system control unit 50 advances the processing to step S1126.

In step S1123, the system control unit 50 does not move the enlargement frame. As mentioned above in step S1107, if the enlargement frame is moved a distance corresponding to one pixel in a leftward direction in response to the user instruction, a region in which no optical image is formed (region 1311) becomes included in an enlargement range indicated by the enlargement frame (a range targeted for enlargement). If such control is performed, the user may feel that usability is low. Therefore, the system control unit 50 keeps the enlargement frame from moving to outside the rectangle 1302R circumscribed around the circular region 1301R, in which the right image is displayed, in other words, keeps the enlargement range indicated by the enlargement frame from including outside the range of the rectangle 1302R.

In step S1124, the system control unit 50 determines whether the direction instruction is a leftward direction instruction. If it is determined that the direction instruction is a leftward direction instruction (YES in step S1124), the system control unit 50 advances the processing to step S1125, and, if not so (NO in step S1124), the system control unit 50 advances the processing to step S1128.

In step S1125, the system control unit 50 determines whether the X coordinate of the center of the enlargement frame obtained before the instruction is received is X=XminR If so (YES in step S1125), the system control unit 50 advances the processing to step S1127, and, if not so (NO in step S1125), the system control unit 50 advances the processing to step S1126.

In step S1126, the system control unit 50 moves the display position of the enlargement frame in the direction designated by the direction instruction. At this time, the amount of movement by which the display position moves according to one occurrence of a direction instruction is assumed to be an amount corresponding to one pixel of the display unit 28.

In step S1127, the system control unit 50 moves the enlargement frame to X=XmaxL. At this time, the system control unit 50 moves the enlargement frame in such a manner that the X coordinate of the center of the enlargement frame becomes X=XmaxL.

In step S1128, the system control unit 50 determines whether the direction instruction is an upward direction instruction. If it is determined that the direction instruction is an upward direction instruction (YES in step S1128), the system control unit 50 advances the processing to step S1129, and, if not so (NO in step S1128), the system control unit 50 advances the processing to step S1131.

In step S1129, the system control unit 50 determines whether the Y coordinate of the center of the enlargement frame obtained before the instruction is received is Y=YminR If so (YES in step S1129), the system control unit 50 advances the processing to step S1130, and, if not so (NO in step S1129), the system control unit 50 advances the processing to step S1132.

In step S1130, the system control unit 50 does not move the enlargement frame. As mentioned above in step S1110, if the enlargement frame is moved a distance corresponding to one pixel in an upward direction in response to the user instruction, a region in which no optical image is formed (region 1311) becomes included in an enlargement range indicated by the enlargement frame (a range targeted for enlargement). Since, if such control is performed, the user may feel that usability is low, the system control unit 50 keeps the enlargement range indicated by the enlargement frame from including outside the range of the rectangle 1302R.

In step S1131, the system control unit 50 determines whether the Y coordinate of the center of the enlargement frame obtained before the instruction is received is Y=YmaxR. If so (YES in step S1131), the system control unit 50 advances the processing to step S1133, and, if not so (NO in step S1131), the system control unit 50 advances the processing to step S1132.

In step S1132, as with step S1126, the system control unit 50 moves the display position of the enlargement frame in the direction designated by the direction instruction. At this time, the amount of movement by which the display position moves according to one occurrence of a direction instruction is assumed to be an amount corresponding to one pixel of the display unit 28.

In step S1133, the system control unit 50 does not move the enlargement frame. As mentioned above in step S1113, if the enlargement frame is moved a distance corresponding to one pixel in a downward direction in response to the user instruction, a region in which no optical image is formed (region 1311) becomes included in an enlargement range indicated by the enlargement frame (a range targeted for enlargement). Since, if such control is performed, the user may feel that usability is low, the system control unit 50 keeps the enlargement range indicated by the enlargement frame from including outside the range of the rectangle 1302R.

In the present exemplary embodiment, control is performed in such a manner that the percentage in which the left image or the right image is included in the enlargement range indicated by the enlargement frame is set at least greater than or equal to one-half (50% or more) of the size of the enlargement frame and the percentage in which the hatched portion (region 1311) is included therein is set less than or equal to one-half (50%) of the size of the enlargement frame. However, even one pixel of the left image or the right image only needs to be included in the enlargement range indicated by the enlargement frame, and the system control unit 50 only needs to prevent all of the regions included in the enlargement range from becoming a region in which no optical image is formed, i.e., the hatched portion (region 1311). Thus, in the present exemplary embodiment, the rectangle 1302L or 1302R in which the enlargement frame is movable does not necessarily need to be circumscribed around the circular region 1301L or 1301R or be a rectangle, or such a region does not need to be provided (calculated). For example, in a case where a touch operation or a movement operation has been performed, the system control unit 50 performs determination of a target range included in the current enlargement frame. In a case where a touch operation has been performed, the system control unit 50 determines whether a portion in which an optical image for the left or right image is formed is included in a target range included in the enlargement frame which has been moved in such a manner that the position of the touch operation becomes the center of the enlargement frame in step S418 or S416 illustrated in FIG. 4 (corresponding to FIG. 10A or 10B). In a case where a movement operation (direction instruction) has been performed, the system control unit 50 determines whether a portion in which an optical image for the left or right image is formed is included in a target range included in the enlargement frame which has been moved in step S608 or S609 illustrated in FIG. 6 (corresponding to FIG. 11A or 11B). The system control unit 50 can determine whether only one pixel of an optical image for the left image or the right image is included in a target range included in the enlargement frame obtained before being moved. If even one pixel of the optical image is included in a target range for the enlargement frame obtained after being displayed and moved, the system control unit 50 sets the enlargement frame movable, and, if no pixel of the optical image is included in the target range, the system control unit 50 sets the enlargement frame immovable.

Thus far is the flow for movement control for items such as the enlargement frame and the focus guide in a case where a direction instruction by, for example, the MC 82 or the arrow keys 74 has been input.

Next, control which is performed in a case where an operation for returning the display positions of items such as the enlargement frame and the focus guide to predetermined positions has been performed is described. In response to receiving a predetermined operation (e.g., pushing of the MC 82 or pressing of the SET button 75), the system control unit 50 displays items such as the enlargement frame and the focus guide at predetermined positions. In a case where a dual-lens image is displayed, in response to receiving a predetermined operation, the system control unit 50 displays the items at the center of any one of the right region and the left region in which the items are displayed before reception of the predetermined operation. On the other hand, in a case where a dual-lens image is not displayed, in response to receiving a predetermined operation, the system control unit 50 displays the items at the center of the screen. This enables adaptively controlling the display positions of the items according to whether the displayed image is a dual-lens image.

In step S610, the system control unit 50 determines whether pushing of the center of the MC 82 (not a movement operation for up, down, left, or right) or pressing of the SET button 75 has been performed. If it is determined that the pushing or pressing has been performed (YES in step S610), the system control unit 50 advances the processing to step S611, and, if not so (NO in step S610), the system control unit 50 advances the processing to step S801 illustrated in FIG. 8A. It can be said that pushing of the MC 82 or pressing of the SET button 75 in this step is a center movement instruction for moving (returning) the currently displayed enlargement frame to the center of an LV image in the region in which the enlargement frame is displayed.

In step S611, as with step S413, the system control unit 50 acquires the type of the lens mounted via the communication terminal groups 6 and 10 and determines whether the mounted lens is a dual lens. If it is determined that the mounted lens is a dual lens (YES in step S611), the system control unit 50 advances the processing to step S616, and, if not so (NO in step S611), the system control unit 50 advances the processing to step S612.

In step S612, as with step S419, the system control unit 50 determines whether the current focus mode of the digital camera 100 is an AF mode or an MF mode. If it is determined that the current focus mode is the AF mode (AF in step S612), the system control unit 50 advances the processing to step S613, and, if it is determined that the current focus mode is the MF mode (MF in step S612), the system control unit 50 advances the processing to step S614.

In step S613, the system control unit 50 moves the AF frame to the center of an LV image displayed on the display unit 28.

In step S614, the system control unit 50 moves the focus guide to the center of an LV image displayed on the display unit 28.

In step S615, the system control unit 50 moves the enlargement frame to the center of an LV image displayed on the display unit 28 in conjunction with the position of the AF frame or a focus detection area of the focus guide.

In step S616, the system control unit 50 determines whether the enlargement frame is currently displayed in an LV image in the right region. Thus, the system control unit 50 determines whether the enlargement frame is currently displayed in the region 701R illustrated in FIG. 7B. If so (YES in step S616), the system control unit 50 advances the processing to step S618, and, if not so (NO in step S616), the system control unit 50 advances the processing to step S617.

In step S617, since a result of the determination in step S616 is NO, the system control unit 50 moves the display position of the enlargement frame to the center of an LV image displayed in the left region. Thus, the system control unit 50 moves the display position of the enlargement frame to the center of an LV image displayed in the region 701L illustrated in FIG. 7B.

In step S618, since a result of the determination in step S616 is YES, the system control unit 50 moves the display position of the enlargement frame to the center of an LV image displayed in the right region. Thus, the system control unit 50 moves the display position of the enlargement frame to the center of an LV image displayed in the region 701R illustrated in FIG. 7B.

Thus far is the flow representing control which is performed in a case where an operation for returning the display positions of items such as the enlargement frame and the focus guide to predetermined positions has been performed.

Processing, which is started in a case where a result of the determination in step S410 illustrated in FIG. 4 is YES, i.e., in a case where it is determined that a dual lens is mounted, for calculating the centers and sizes of two LV images (a left image and a right image) with use of lens information such as that illustrated in FIG. 12 and determining positions at which two LV images are displayed in one optical image captured by the imaging unit 22 and composed of two LV images and a blank (hatched) region is described with reference to FIG. 13.

In the case of moving the enlargement frame in such a way as illustrated in FIG. 4 and FIG. 6, at the time of moving the enlargement frame on two LV images, if the enlargement frame is made movable to the blank portion, no LV image may be included in an image enlarged and displayed at the time of execution of enlargement. Alternatively, a large portion of the image enlarged and displayed may be a blank region and include only a small portion of an LV image, so that this has a high probability of causing confusion for the user. Therefore, the system control unit 50 calculates two rectangular regions (regions 1302L and 1302R) in which circular regions, which are display regions of two LV images, are respectively inscribed, and, in a case where a movement instruction for the enlargement frame has been issued by the user, the system control unit 50 makes the enlargement frame movable only within the calculated rectangular regions.

First, the system control unit 50 calculates the center position of each of the rectangular regions 1302L and 1302R from the acquired lens information illustrated in FIG. 12. The rectangular regions 1302L and 1302R are rectangles circumscribed around the circular regions 1301L and 1301R, respectively. The circular regions 1301L and 1301R are regions obtained by converting a circular optical image 1201L, which is formed by the right eye optical system 301R, and a circular optical image 1201R, which is formed by the left eye optical system 301L, onto a logical coordinate system 1300, respectively. The system control unit 50 acquires, from the lens mounted via the communication terminal groups 6 and 10, distances 1203L and 1203R between the center position of a physical coordinate system 1200 for optical images and the center positions of the circular optical images 1201L and 1201R, respectively.

The center positions 1304L and 1304R of the rectangular regions 1302L and 1302R can be expressed by the following equations with use of the center position 1303 of the logical coordinate system 1300 for optical images, a conversion coefficient k determined by the ratio between sizes of the physical coordinate system and logical coordinate system, and the distances 1203L and 1203R.

$$1304L = 1303 - (1203L \div k)$$

$$1304R = 1303 - (1203R \div k)$$

Next, the system control unit 50 calculates the sizes of the rectangular regions 1302L and 1302R from the lens information. The system control unit 50 acquires the radii 1204L and 1204R of the respective circular optical images 1201L and 1201R from the lens information, as illustrated in FIG. 12. The sizes of the rectangular regions 1302L and 1302R can be expressed by the following equations with use of a conversion coefficient k determined by the ratio between sizes of the physical coordinate system and logical coordinate system and the radii 1204L and 1204R.

$$\text{Size of } 1302L = (1204L \div k) \times 2$$

$$\text{Size of } 1302R = (1204R \div k) \times 2$$

The distances 1203L and 1203R and the radii 1204L and 1204R are determined by the type of the lens, and the conversion coefficient k for converting the physical coordinate system for optical images into the logical coordinate system is determined by the type of the image sensor. Performing calculation in this way enables obtaining the center positions and sizes of the rectangular regions 1302L and 1302R even if the type of the lens or the type of the image sensor changes.

The system control unit 50 is able to determine coordinates for use in performing movement restriction of the enlargement frame, described above with reference to FIGS. 10A and 10B, from the center positions and sizes of the rectangular regions 1302L and 1302R and the size of the enlargement frame.

Thus, the system control unit 50 is able to obtain XminL, XmaxL, YminL, and YmaxL from the sizes of the rectangular region 1302L and the enlargement frame.

XminL and XmaxL represent coordinates in the horizontal axis (X-axis) direction, and become coordinates indicating that the enlargement frame is in contact with the inside of the left or right side of the rectangle 1302L when the central coordinate position of the enlargement frame has arrived at XminL or XmaxL. The system control unit 50 performs control in such a manner that, when a movement instruction for a direction opposite to the center position 1304L as viewed from the enlargement frame is issued in a state in which the central coordinate position of the enlargement frame has arrived at XminL or XmaxL, the enlargement frame is limited in movement or is caused to jump to the other LV image (rectangular region).

XminL represents the center position of the enlargement frame obtained in a state in which the left side of the enlargement frame is in contact with the left side of the rectangle 1302L. Thus, XminL denotes a value obtained by subtracting a distance corresponding to one-half of the size of the enlargement frame in the horizontal direction (X-direction) inside the rectangle 1302L and on the side of the center position 1304L, from the X coordinate of the left side of the rectangle 1302L.

XmaxL represents the center position of the enlargement frame obtained in a state in which the right side of the enlargement frame is in contact with the right side of the rectangle 1302L. Thus, XmaxL denotes a value obtained by subtracting a distance corresponding to one-half of the size of the enlargement frame in the horizontal direction (X-direction) inside the rectangle 1302L and on the side of the center position 1304L, from the X coordinate of the right side of the rectangle 1302L.

YminL and YmaxL represent coordinates in the vertical axis (Y-axis) direction, and become coordinates indicating that the enlargement frame is in contact with the inside of the upper or lower side of the rectangle 1302L when the central coordinate position of the enlargement frame has arrived at YminL or YmaxL. The system control unit 50 performs control in such a manner that, when a movement instruction for a direction opposite to the center position 1304L as viewed from the enlargement frame is issued in a state in which the central coordinate position of the enlargement frame has arrived at YminL or YmaxL, the enlargement frame is limited in movement.

YminL represents the center position of the enlargement frame obtained in a state in which the upper side of the enlargement frame is in contact with the upper side of the rectangle 1302L. Thus, YminL denotes a value obtained by subtracting a distance corresponding to one-half of the size of the enlargement frame in the vertical direction (Y-direction) inside the rectangle 1302L and on the side of the center position 1304L, from the Y coordinate of the upper side of the rectangle 1302L.

YmaxL represents the center position of the enlargement frame obtained in a state in which the lower side of the enlargement frame is in contact with the lower side of the rectangle 1302L. Thus, YmaxL denotes a value obtained by subtracting a distance corresponding to one-half of the size of the enlargement frame in the vertical direction (Y-direction) inside the rectangle 1302L and on the side of the center position 1304L, from the Y coordinate of the lower side of the rectangle 1302L.

Similarly, the system control unit 50 is able to obtain XminR, XmaxR, YminR, and YmaxR from the sizes of the rectangular region 1302R and the enlargement frame. Unlike the case of the rectangular region 1302L, such coordinates are in reflective symmetry with respect to the line 1305.

As with XminL and XmaxL, XminR and XmaxR represent coordinates in the horizontal axis (X-axis) direction, and become coordinates indicating that the enlargement frame is in contact with the inside of the left or right side of the rectangle 1302R when the central coordinate position of the enlargement frame has arrived at XminR or XmaxR. The system control unit 50 performs control in such a manner that, when a movement instruction for a direction opposite to the center position 1304R as viewed from the enlargement frame is issued in a state in which the central coordinate position of the enlargement frame has arrived at XminR or XmaxR, the enlargement frame is limited in movement or is caused to jump to the other LV image (rectangular region).

XminR represents the center position of the enlargement frame obtained in a state in which the left side of the enlargement frame is in contact with the left side of the rectangle 1302R, and XmaxR represents the center position of the enlargement frame obtained in a state in which the right side of the enlargement frame is in contact with the right side of the rectangle 1302R. XminR denotes a value obtained by subtracting a distance corresponding to one-half of the size of the enlargement frame in the horizontal direction (X-direction) inside the rectangle 1302R and on the side of the center position 1304R, from the X coordinate of the left side of the rectangle 1302R, and XmaxR denotes a value obtained by subtracting a distance corresponding to one-half of the size of the enlargement frame in the horizontal direction (X-direction) inside the rectangle 1302R and on the side of the center position 1304R, from the X coordinate of the right side of the rectangle 1302R.

As with YminL and YmaxL, YminR and YmaxR represent coordinates in the vertical axis (Y-axis) direction, and become coordinates indicating that the enlargement frame is in contact with the inside of the upper or lower side of the rectangle 1302L when the central coordinate position of the enlargement frame has arrived at YminR or YmaxR. The system control unit 50 performs control in such a manner that, when a movement instruction for a direction opposite to the center position 1304R as viewed from the enlargement frame is issued in a state in which the central coordinate position of the enlargement frame has arrived at YminR or YmaxR, the enlargement frame is limited in movement.

YminR represents the center position of the enlargement frame obtained in a state in which the upper side of the enlargement frame is in contact with the upper side of the rectangle 1302R, and YmaxR represents the center position of the enlargement frame obtained in a state in which the lower side of the enlargement frame is in contact with the lower side of the rectangle 1302R. Thus, YminR denotes a value obtained by subtracting a distance corresponding to one-half of the size of the enlargement frame in the vertical direction (Y-direction) inside the rectangle 1302R and on the side of the center position 1304R, from the Y coordinate of the upper side of the rectangle 1302R, and YmaxR denotes a value obtained by subtracting a distance corresponding to one-half of the size of the enlargement frame in the vertical direction (Y-direction) inside the rectangle 1302R and on the side of the center position 1304R, from the Y coordinate of the lower side of the rectangle 1302R.

XminL and XminR, XmaxL and XmaxR, YminL and YminR, and YmaxL and

YmaxR vary according to lens information which is acquired, i.e., the values of the center positions 1304L and 1304R and the circular regions 1301L and 1301R. For example, even in the case of a dual lens, different pieces of lens information may be acquired depending on, for example, parameters used at the time of manufacturing thereof. Therefore, XminL and XminR, XmaxL and XmaxR, YminL and YminR, and YmaxL and YmaxR do not necessarily coincide with each other. Thus, the system control unit 50 obtains the center positions and sizes of the rectangular regions 1302L and 1302R from respective pieces of lens information about the left and right optical systems, and calculates the X coordinate and Y coordinate to perform different control operations depending on the display position of the enlargement frame.

Beneficial Effects

As described above, the system control unit 50 performs control in such a manner that, when a position designation by a touch operation or a direction instruction (movement instruction) by the MC 82 or the arrow keys 74 has been performed, the central coordinate position of the enlargement frame indicating an enlargement region does not move to outside a rectangular region in which an LV image displayed in a circular shape is inscribed. Thus, even if an instruction is issued by the user, the central coordinate position of the enlargement frame does not move to regions other than the rectangular regions 1302L and 1302R in which the circular regions 1301L and 1301R are respectively inscribed. Performing such control prevents a region in which no LV image is displayed from being displayed in an enlarged manner when an enlargement instruction is issued by the user, and enables reducing the probability of the user being confused. Additionally, performing enlargement display enables checking every detail of an LV image in more detail.

Next, enlargement processing and change processing for an enlargement factor which are performed when the enlargement button 78 has been pressed are described.

Figure 8B:
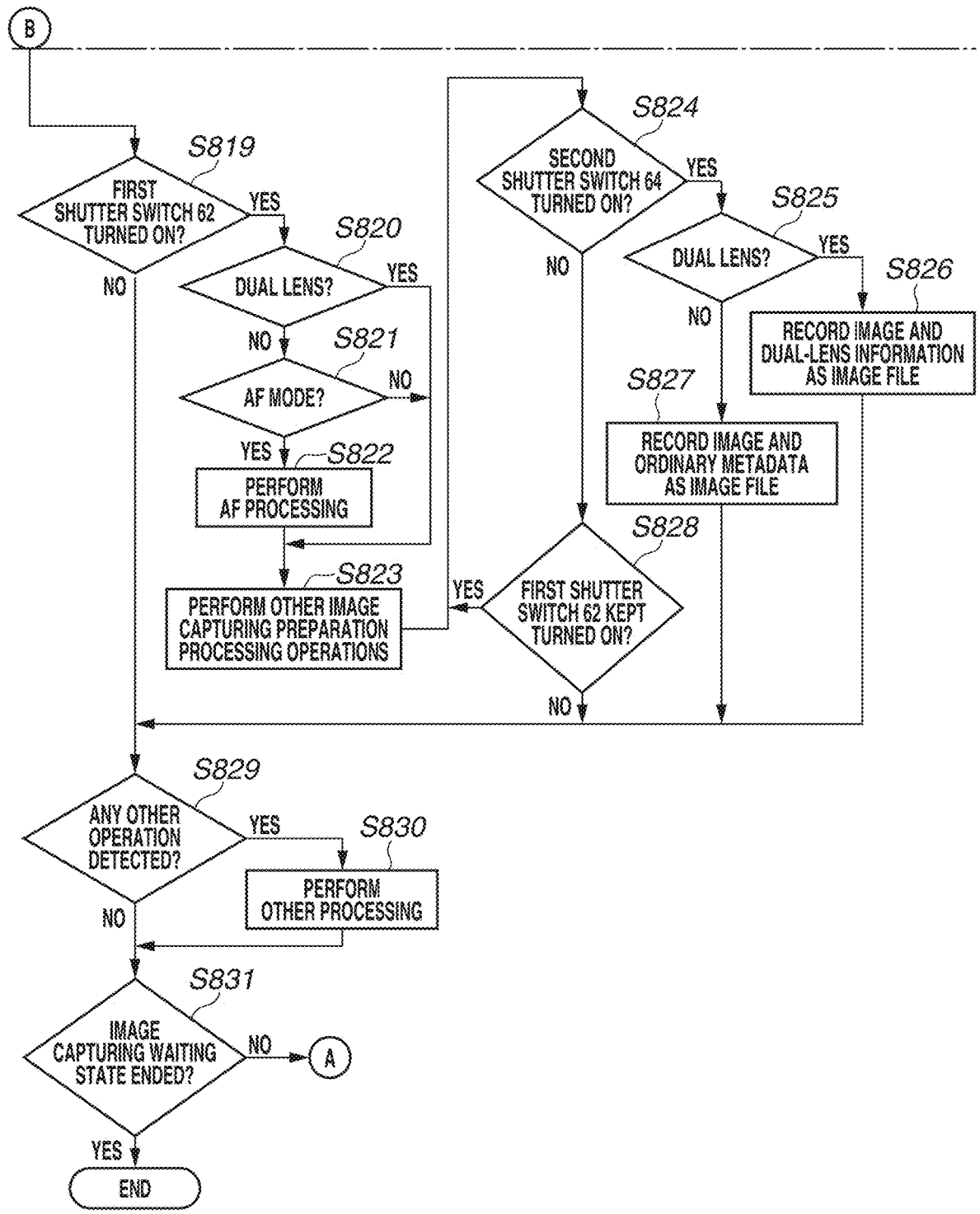

FIGS. 8A and 8B are control flowcharts concerning an enlargement operation and an image capturing operation for an LV image which is displayed on the display unit 28 in the present exemplary embodiment. Examples of displaying on the display unit 28 in a case where the control flowcharts of FIGS. 8A and 8B are performed are described with reference to FIGS. 9A, 9B, 9C, 9D, 9E, and 9F. Furthermore, details of display examples illustrated in FIGS. 9A to 9F are described below after the control flowcharts of FIGS. 8A and 8B are described.

In step S801, the system control unit 50 determines whether the enlargement button 78 has been pressed. If it is determined that the enlargement button 78 has been pressed (YES in step S801), the system control unit 50 advances the processing to step S802, and, if not so (NO in step S801), the system control unit 50 advances the processing to step S819. While, in the present exemplary embodiment, an enlargement instruction by the user is assumed to be pressing of the enlargement button 78, the present exemplary embodiment is not limited to this, and, for example, pinch-out on the touch panel 70a can be set as an instruction for enlargement display and pinch-in thereon can be set as an instruction for cancellation of enlargement display.

In step S802, as with step S410, the system control unit 50 acquires the type of the lens mounted via the communication terminal groups 6 and 10 and determines whether the mounted lens is a dual lens. If it is determined that the mounted lens is a dual lens (YES in step S802), the system control unit 50 advances the processing to step S803, and, if not so (NO in step S802), the system control unit 50 advances the processing to step S812.

Figure 9A:
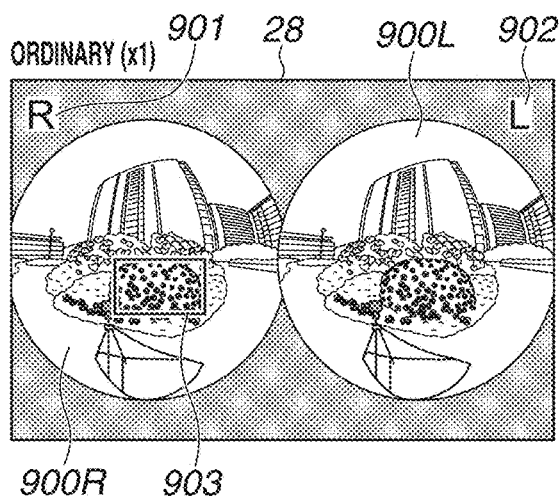
FIGS. 9A, 9B, 9C, 9D, 9E, and 9F are diagrams used to explain an enlargement operation in the camera with the dual lens mounted thereon.
Figure 9B:
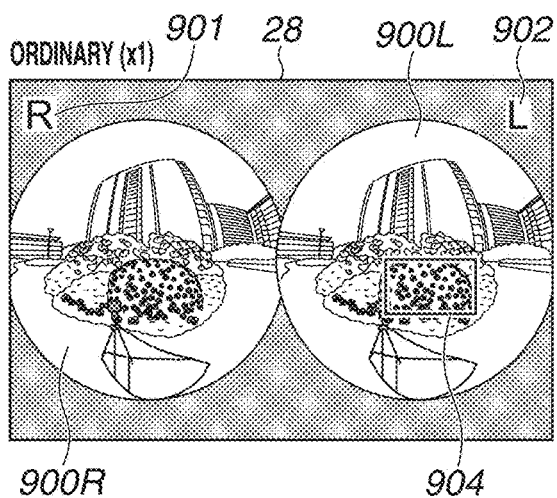
Figure 9C:
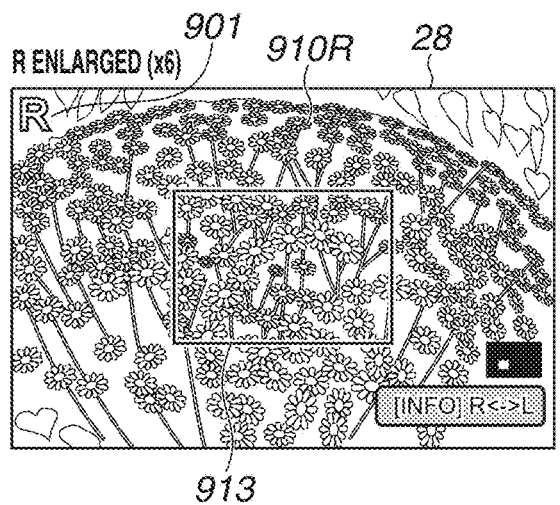
Figure 9D:
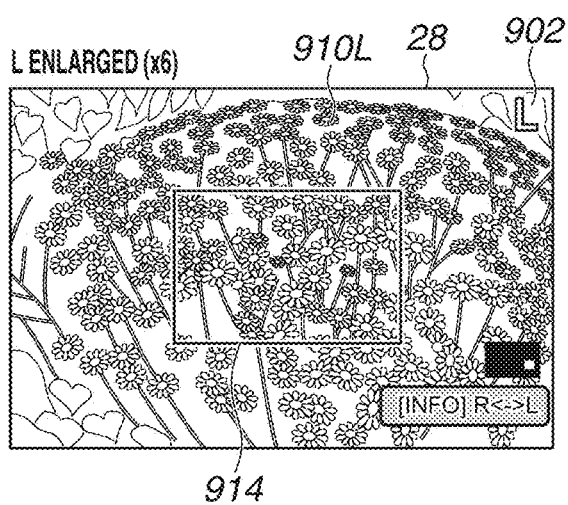

In step S803, the system control unit 50 enlarges an LV image in a position at which the enlargement frame is displayed six times and displays the enlarged LV image on the display unit 28. The size of the enlargement frame which is displayed before enlargement processing is performed is assumed to be previously set in such a manner that the entirety of the enlarged image is displayed on the display unit 28 in a case where enlargement processing with an enlargement factor of six times is performed. Such an enlargement factor of six times is an enlargement factor that is based on a state in which an LV image to be displayed on the display unit 28 is not enlarged (is displayed at a unit magnification). Display examples at that time are illustrated in FIGS. 9C and 9D.

In step S804, the system control unit 50 determines whether a movement operation for the enlargement position (a region being enlarged) has been performed. If it is determined that a movement operation for the enlargement position has been performed (YES in step S804), the system control unit 50 advances the processing to step S805, and, if not so (NO in step S804), the system control unit 50 advances the processing to step S806. The movement operation for the enlargement position is assumed to be a direction instruction by the MC 82 or the arrow keys 74, as mentioned in the flowchart of FIG. 6. Furthermore, the movement operation for the enlargement position can be performed by an operation on the touch panel 70a.

In step S805, the system control unit 50 moves the enlargement position only within a region being currently enlarged out of left and right display regions for two LV images which are displayed on the display unit 28, based on the movement operation for the enlargement position in step S804. In other words, even if, in a state in which the region targeted for enlargement processing is in contact with the line 705 in any one of the left and right regions, a movement operation for bringing the center of the enlargement position further close to the line 705 is performed, the system control unit 50 disables the movement operation and thus does not move the enlargement position.

In the case of the movement of the enlargement frame when an LV image is in the state of a unit magnification as mentioned in steps S607 to S614, since the user is able to visually recognize the enlargement frame displayed on the display unit 28, even if the enlargement frame is made movable from one region currently used for displaying to the other region, the user never loses the enlargement frame. On the other hand, if, in a state in which the enlarged image is being displayed, the enlargement position is moved in such a way as to span the regions, it is difficult for the user to intuitively know which position the enlarged image is showing.

Suppose a case where the user wants to check the left end of an LV image in the right region (a state in which the left side of the enlargement position is in contact with the line 705) in more detail. If, in response to the user unintentionally performing a movement operation for the enlargement frame while checking the enlarged and displayed region of the left end of an LV image in the right region, a region to be enlarged and displayed becomes an LV image of the right end of an LV image in the left region, this may cause confusion for the user. Therefore, in a state in which the enlarged image is being displayed, in a case where, when a movement instruction for the enlargement position is issued by the user, the enlargement position is an end portion of each LV image, the system control unit 50 prevents the enlargement position from moving between left and right regions.

In step S806, the system control unit 50 determines whether a left-right switching operation has been performed. If it is determined that a left-right switching operation has been performed (YES in step S806), the system control unit 50 advances the processing to step S807, and, if not so (NO in step S806), the system control unit 50 advances the processing to step S808. The left-right switching operation refers to a switching operation from one image to the other image out of two images displayed side by side in the left-right direction. Specifically, the left-right switching operation is assumed to be pressing of a button having a left-right switching function (for example, an INFO button (not illustrated)).

In step S807, the system control unit 50 moves the enlargement position from one region in which the enlargement position is set before the button having a left-right switching function is pressed to the other region and then performs enlargement displaying in the other region. At this time, the system control unit 50 moves the enlargement position in such a manner that the relative position of the enlargement position in the region in which the enlargement position is set before the button having a left-right switching function is pressed is kept even after the enlargement position is moved to the other region. For example, when enlarging an LV image in the right region, the system control unit 50 calculates a distance from the center of the LV image in the right region to the enlargement position. In response to a left-right switching operation being performed by the user, the system control unit 50 applies the calculated distance from the center of the LV image to the enlargement position to a distance from the center of an LV image in the opposite region (here, the left region) to the enlargement position and then performs enlargement displaying at the enlargement position on the display unit 28.

With such control performed, in a case where the user wants to check the same positions of both left and right LV images displayed side by side in the left-right direction, the user is enabled to simply perform left-right switching of left and right LV images with a smaller number of operations, so that the user does not need to spend much time on image capturing.

In step S808, the system control unit 50 determines whether the enlargement button 78 has been pressed. If it is determined that the enlargement button 78 has been pressed (YES in step S808), the system control unit 50 advances the processing to step S809, and, if not so (NO in step S808), the system control unit 50 returns the processing to step S804.

In step S809, the system control unit 50 refers to the system memory 52 and determines whether the enlargement factor for an LV image to be displayed on the display unit 28 is 15 times. If it is determined that the enlargement factor is 15 times (YES in step S809), the system control unit 50 advances the processing to step S810, and, if not so (NO in step S809), the system control unit 50 advances the processing to step S811.

In step S810, the system control unit 50 cancels the enlargement state for an LV image and displays an LV image which is not enlarged (is at a unit magnification) on the display unit 28. Display examples at that time are illustrated in FIGS. 9A and 9B.

Figure 9E:
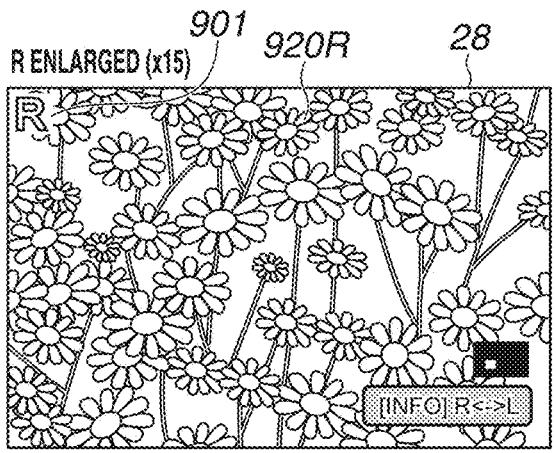
Figure 9F:
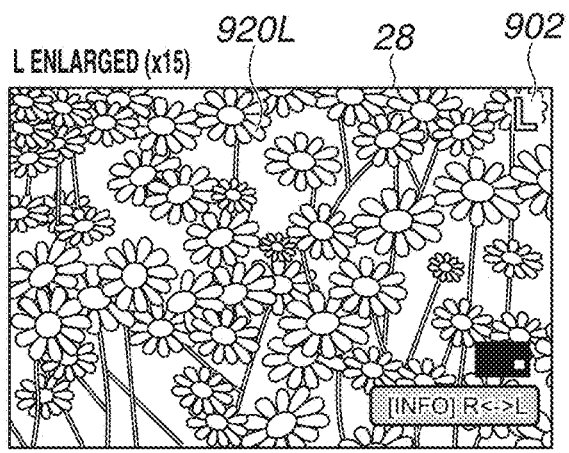

In step S811, the system control unit 50 performs enlargement displaying of an LV image at an enlargement factor of 15 times at the display position of the enlargement frame superimposed on the LV image on the display unit 28. Such an enlargement factor of 15 times is an enlargement factor that is based on an LV image which is not enlarged (is displayed at a unit magnification). Display examples at that time are illustrated in FIGS. 9E and 9F.

In step S812, since a result of the determination in step S802 is NO, the system control unit 50 performs enlargement displaying of an LV image at an enlargement factor of six times at the display position of the enlargement frame superimposed on the LV image on the display unit 28. Such an enlargement factor of six times is an enlargement factor that is based on an LV image which is not enlarged (is displayed at a unit magnification).

In step S813, as with step S804, the system control unit 50 determines whether a movement operation for the enlargement position has been performed. If it is determined that a movement operation for the enlargement position has been performed (YES in step S813), the system control unit 50 advances the processing to step S814, and, if not so (NO in step S813), the system control unit 50 advances the processing to step S815.

In step S814, the system control unit 50 moves the enlargement position within the display region for an LV image based on the movement operation for the enlargement position. In this step, a result of the determination in step S802 being NO makes it known that the lens mounted on the digital camera 100 is a single lens or no lens is mounted thereon. Thus, since only one LV image is displayed on the display unit 28, the system control unit 50 is able to move the enlargement position without taking into consideration left and right regions such as in step S805.

In step S815, as with step S808, the system control unit 50 determines whether the enlargement button 78 has been pressed. If it is determined that the enlargement button 78 has been pressed (YES in step S815), the system control unit 50 advances the processing to step S816, and, if not so (NO in step S815), the system control unit 50 returns the processing to step S813.

In step S816, the system control unit 50 refers to the system memory 52 and determines whether the enlargement factor for an LV image currently displayed is 15 times. If it is determined that the enlargement factor is 15 times (YES in step S816), the system control unit 50 advances the processing to step S817, and, if not so (NO in step S816), the system control unit 50 advances the processing to step S818.

In step S817, as with step S810, the system control unit 50 cancels the enlargement state for an LV image and displays an LV image which is not enlarged (is at a unit magnification) on the display unit 28.

In step S818, the system control unit 50 performs enlargement displaying of an LV image at an enlargement factor of 15 times at the display position of the enlargement frame superimposed on the LV image on the display unit 28. Such an enlargement factor of 15 times is an enlargement factor that is based on an LV image which is not enlarged (is displayed at a unit magnification).

In step S819, the system control unit 50 determines whether the first shutter switch 62 has been turned on. If it is determined that the first shutter switch 62 has been turned on (YES in step S819), the system control unit 50 advances the processing to step S820, and, if not so (NO in step S819), the system control unit 50 advances the processing to step S829. The first shutter switch 62 being turned on refers to a state in which the shutter button 61 is in a half-pressed state as mentioned above. Thus, it is supposable that the user is going to perform image capturing.

In step S820, as with step S410, the system control unit 50 acquires the type of the lens mounted via the communication terminal groups 6 and 10 and determines whether the mounted lens is a dual lens. If it is determined that the mounted lens is a dual lens (YES in step S820), the system control unit 50 advances the processing to step S823, and, if not so (NO in step S820), the system control unit 50 advances the processing to step S821.

In step S821, the system control unit 50 determines whether the focus mode is set to the AF mode. If it is determined that the focus mode is set to the AF mode (YES in step S821), the system control unit 50 advances the processing to step S822, and, if not so (if it is determined that the focus mode is set to the MF mode) (NO in step S821), the system control unit 50 advances the processing to step S823. Switching between the AF mode and the MF mode is performed via, for example, a setting menu screen or a switch mounted on the exterior portion of the lens unit 150.

In step S822, the system control unit 50 performs AF processing based on the position of the AF frame.

In step S823, the system control unit 50 performs other image capturing preparation operations such as automatic exposure (AE) and automatic white balance (AWB).

In step S824, the system control unit 50 determines whether the second shutter switch 64 has been turned on. If it is determined that the second shutter switch 64 has been turned on, i.e., the shutter button 61 has been fully pressed (YES in step S824), the system control unit 50 advances the processing to step S825, and, if not so (NO in step S824), the system control unit 50 advances the processing to step S828.

In step S825, as with step S410, the system control unit 50 acquires the type of the lens mounted via the communication terminal groups 6 and 10 and determines whether the mounted lens is a dual lens. If it is determined that the mounted lens is a dual lens (YES in step S825), the system control unit 50 advances the processing to step S826, and, if not so (NO in step S825), the system control unit 50 advances the processing to step S827.

In step S826, the system control unit 50 performs a series of image capturing processing operations until recording, for example, an image captured via a dual lens and dual-lens information as an image file on the recording medium 200.

In step S827, the system control unit 50 performs a series of image capturing processing operations until recording, for example, a captured image captured and ordinary (single-lens) information as an image file on the recording medium 200.

In step S828, the system control unit 50 determines whether the first shutter switch 62 is kept turned on. If it is determined that the first shutter switch 62 is kept turned on (YES in step S828), the system control unit 50 returns the processing to step S824, and, if not so (NO in step S828), the system control unit 50 advances the processing to step S829.

In step S829, the system control unit 50 determines whether any operation other than the above-mentioned operations has been detected. If it is determined that any other operation has been detected (YES in step S829), the system control unit 50 advances the processing to step S830, and, if not so (NO in step S829), the system control unit 50 advances the processing to step S831. Specifically, the system control unit 50 determines whether pressing of, for example, the menu button 81 or the playback button 79 has been detected.

In step S830, the system control unit 50 starts performing other processing corresponding to the detected other operation. In a case where the menu button 81 has been pressed, the system control unit 50 displays a setting menu screen, and, in a case where the playback button 79 has been pressed, the system control unit 50 displays an image stored in the recording medium 200 on the display unit 28.

In step S831, the system control unit 50 determines whether the image capturing waiting state has ended. For example, in a case where the image capturing waiting state has ended due to, for example, powering-off of the digital camera 100 (YES in step S831), the system control unit 50 ends the control flowcharts of FIGS. 8A and 8B, and, if not so (NO in step S831), the system control unit 50 returns the processing to step S401 illustrated in FIG. 4.

LV images each of which is displayed on the display unit 28 when an enlargement instruction is issued by the user are described with reference to FIGS. 9A to 9F.

FIG. 9A illustrates a display example in a case where the enlargement factor corresponds to a unit magnification (i.e., an unmagnified state) and the enlargement frame 903 is displayed in the left region, i.e., in superimposition on an LV image (LV image 900R) captured via the right eye optical system 301R. On the display unit 28, the LV image 900R captured via the right eye optical system 301R and an LV image 900L captured via the left eye optical system 301L are displayed. As mentioned above, the LV image 900R, which is displayed in the left region, is an image captured via the right eye optical system 301R, and the LV image 900L, which is displayed in the right region, is an image captured via the left eye optical system 301L.

To inform the user that inversion between left and right occurs, indication items 901 and 902 are displayed. The indication item 901 is displayed as "R", which indicates right, and the indication item 902 is displayed as "L", which indicates left. In the state illustrated in FIG. 9A, in response to the enlargement button 78 being pressed once, a transition to a state illustrated in FIG. 9C occurs, and, in response to a left-right switching button (not illustrated) being pressed once, the enlargement frame superimposed on the LV image 900R moves to the relatively same position in the LV image 900L and a transition to a state illustrated in FIG. 9B occurs.

FIG. 9B illustrates a display example in a case where the enlargement factor corresponds to a unit magnification (i.e., an unmagnified state) and the enlargement frame 904 is displayed in the right region, i.e., in superimposition on an LV image (LV image 900L) captured via the left eye optical system 301L. In FIG. 9B, the enlargement frame 904 is displayed in superimposition on the LV image 900L. In the state illustrated in FIG. 9B, in response to the enlargement button 78 being pressed once, a transition to a state illustrated in FIG. 9D occurs, and, in response to the left-right switching button being pressed once, the enlargement frame superimposed on the LV image 900L moves to the relatively same position in the LV image 900R and a transition to the state illustrated in FIG. 9A occurs.

FIG. 9C illustrates a display example in a case where the LV image 900R has been enlarged at an enlargement factor of six times. The indication item 901, which indicates via which optical system the enlarged image displayed on the display unit 28 has been captured, is displayed in superimposition on an LV image 910R, which is an enlarged LV image.

FIG. 9D illustrates a display example in a case where the LV image 900L has been enlarged at an enlargement factor of six times. The indication item 902, which indicates via which optical system the enlarged image displayed on the display unit 28 has been captured, is displayed in superimposition on an LV image 910L, which is an enlarged LV image.

FIG. 9E illustrates a display example in a case where the LV image 900R has been enlarged at an enlargement factor of 15 times for display.

In the enlarged image displayed on the display unit 28, the indication item 901, which indicates an LV image captured via the right eye optical system 301R, is displayed in superimposition on an LV image 920R, which is an LV image enlarged 15 times.

FIG. 9F illustrates a display example in a case where the LV image 900L has been enlarged at an enlargement factor of 15 times for display.

In the enlarged image displayed on the display unit 28, the indication item 902, which indicates an LV image captured via the left eye optical system 301L, is displayed in superimposition on an LV image 920L, which is an LV image enlarged 15 times.

Thus, FIGS. 9A and 9B illustrate LV images displayed on the display unit 28 in a case where the enlargement factor corresponds to a unit magnification (i.e., an unmagnified state), FIGS. 9C and 9D illustrate LV images displayed on the display unit 28 in a case where the enlargement factor is six times, and FIGS. 9E and 9F illustrate LV images displayed on the display unit 28 in a case where the enlargement factor is 15 times.

Each time the enlargement button 78 is pressed once, the enlargement factor for LV images to be displayed on the display unit 28 is changed in order of unit magnification, six times, 15 times, and unit magnification. Moreover, if the left-right switching button is pressed, in a case where the enlargement factor corresponds to a unit magnification, switching is performed in such a way as to display the enlargement frame in superimposition on the other LV image. Thus, in a case where the enlargement frame is displayed in superimposition on the LV image 900R, which is displayed in the left region, the display region is switched in such a way as to display the enlargement frame in superimposition on the LV image 900L, which is displayed in the right region. In a case where the enlargement factor is other than a unit magnification, the enlargement position is switched to the region of the other LV image serving as the relatively same position. At this time, the enlargement factor is not changed.

Furthermore, while, in the above description, operations for, for example, an instruction for switching of the display mode, an instruction for movement for the enlargement frame or the enlargement position, and an instruction for enlargement are performed via operation buttons having respective dedicated functions, the respective functions can be allocated to buttons to which various optional functions are able to be allocated.

As described above, in a case where image capturing is performed with a lens including two optical systems (dual lens) mounted, during image capturing, the system control unit 50 causes the enlargement frame indicating the enlargement position of an LV image to include a region in which an optical image is formed (not to include only a region in which no optical image is formed). The system control unit 50 displays two LV images captured via two optical systems side by side in the left-right direction on the display unit 28, and performs displaying and movement of the enlargement frame in such a way as not to include only a region in which no optical image is formed and in such a way as to include at least a part of a region (of a left image or a right image) in which an optical image is formed. With this control performed, when the user has issued an enlargement instruction, it is possible to prevent only a region in which no optical image is formed from being enlarged and displayed, and it is possible to reduce the user from becoming confused.

Moreover, in a case where two LV images are displayed at a unit magnification (in an unmagnified state), when a position designation by a touch operation or a direction instruction (movement instruction) by the MC 82 or the arrow keys 74 has been performed, the system control unit 50 performs control in such a manner that the center of the enlargement frame does not move to outside a rectangular region in which an LV image displayed in a circular form is inscribed.

Thus, even if an instruction by the user has been issued, the central coordinate position of the enlargement frame does not move to the region 1311, which represents a blank (hatched) portion obtained by excluding the rectangular regions 1302L and 1302R circumscribed around the circular regions 1301L and 1301R from the region 1310 of the display unit 28. Performing such control enables preventing a region in which no LV image is displayed from being displayed in an enlarged manner when an enlargement instruction has been issued by the user, and enables reducing the probability of the user becoming confused. Additionally, performing such control enables checking every detail of an LV image in more detail.

On the other hand, in a case where any one of two LV images has been enlarged, even if a movement instruction for the enlargement position is issued in a state in which the enlargement frame has arrived at an end on the boundary side of the currently enlarged image (the right end in the case of enlarging the left region, and the left end in the case of enlarging the right region), the system control unit 50 does not move the enlargement position in a direction designated by the movement instruction. Thus, in a situation in which it is difficult for the user to visually recognize the current enlargement position, the system control unit 50 does not move the enlargement position beyond the region (a boundary between LV images). This enables reducing an unintended movement of the enlargement position beyond the boundary between LV images, and enables reducing the user from becoming confused.

Moreover, in a case where a lens including two optical systems (dual lens) is mounted, the system control unit 50 causes the focus guide and the enlargement frame not to move in conjunction with each other. With this control, in a case where two LV images are displayed, for example, at the time of mounting of a dual lens and it is difficult to check every detail of an LV image which is in an unenlarged state, there is a high possibility that the user wants to enlarge an LV image irrespective of the in-focus position and check the LV image in more detail. Therefore, without enabling enlarging only the position of the focus guide having a frame indicating the focus detection area, to enable the user to enlarge the desired position, the system control unit 50 causes the focus guide and the enlargement frame not to move in conjunction with each other. On the other hand, in a case where an ordinary lens (single lens) is mounted, the system control unit 50 causes the focus guide or the AF frame and the enlargement frame to move in conjunction with each other, so that, when the focus guide or the AF frame is moved, the position of the enlargement frame is also moved together. Since only one LV image is displayed at the time of mounting of a single lens and the LV image is displayed on the display unit 28 in a size larger than in a case where two LV images are displayed, it is easy to check the LV image in the state of a unit magnification in more detail than at the time of mounting of a dual lens.

Furthermore, the above-described various control operations, which have been described as being performed by the system control unit 50, can be performed by one piece of hardware or can be performed by a plurality of pieces of hardware sharing processing operations to control the entire equipment.

Moreover, while the disclosure has been described in detail based on exemplary embodiments thereof, the disclosure is not limited to such specific exemplary embodiments, and various configurations which are included in a range not departing from the gist of the disclosure are also included in the disclosure. Additionally, the above-described exemplary embodiments represent only examples of implementation of the disclosure, and some or all of the above-described exemplary embodiments can be combined as appropriate.

Moreover, while, in the above-described exemplary embodiments, an example in which the disclosure is applied to the digital camera 100 has been described, the disclosure is not limited to this example, but can also be applied to electronic equipment capable of displaying images captured via two optical systems. Thus, the disclosure can be applied to, for example, a personal computer, a personal digital assistant (PDA), a mobile telephone terminal, a portable image viewer, a printer apparatus with a display, a digital photo frame, a music player, a gaming machine, a digital book reader, home electrical appliance, a vehicle-mounted apparatus, and medical equipment.

Moreover, the disclosure can be applied to not only an imaging apparatus body but also electronic equipment which communicates with an imaging apparatus (including a network camera) via wired or wireless communication to remotely control the imaging apparatus. Examples of the electronic equipment which remotely controls the imaging apparatus include a smartphone, a tablet personal computer (PC), and a desktop PC. The electronic equipment is able to communicate, to the imaging apparatus, commands for causing the imaging apparatus to perform various operations and settings based on an operation performed on the electronic equipment or a processing operation performed by the electronic equipment, thus remotely controlling the imaging apparatus. Moreover, the electronic equipment can be configured to receive a live view image captured by the imaging apparatus via wired or wireless communication and display the received live view image thereon.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to aspects of the disclosure, it is possible to check every detail of an image, and it is possible to perform enlargement displaying in such a way as not to cause confusion for the user.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-091347 filed May 31, 2021, which is hereby incorporated by reference herein in its entirety.

What is claimed is:

1. Electronic equipment comprising:
    a processor; and
    a memory storing a program which, when executed by the processor, causes the electronic equipment to:
    acquire a third image in which a first image captured via a first optical system and a second image captured via a second optical system and having parallax with respect to the first image are arranged side by side;
    apply predetermined processing to a target range included in the third image; and
    wherein each of the first image and the second image is a circular region, set a rectangular region circumscribed around a circular region of the first image or a circular region of the second image as a movable region in which the target range included in the third image is movable.

2. The electronic equipment according to claim 1, wherein the program when executed by the processor further causes the electronic equipment to:
    perform control in such a way as to display an item indicating the target range on the third image; and
    perform control in such a way as to move and display the item within the movable region according to a user operation,
    wherein the predetermined processing is applied to a target range included in the third image and corresponding to a position at which the item is displayed.

3. The electronic equipment according to claim 2, wherein the program when executed by the processor further causes the electronic equipment to:
    perform control in such a way as to display, on a screen, the first image and the second image side by side in such a manner that the first image is located left and the second image is located right; and perform control in such a way as not to change a position of the item even if, after a position of the item arrives at a right end of the movable region of the first image, a user operation for further movement in a rightward direction is received, and in such a way as not to change a position of the item even if, after a position of the item arrives at a left end of the movable region of the second image, a user operation for further movement in a leftward direction is received.

4. The electronic equipment according to claim 2, wherein the program when executed by the processor further causes the electronic equipment to:
discriminate a lens unit mounted on the electronic equipment; and
perform control in such a way as to display the item within the movable region in a case where the discriminated lens unit includes the first optical system and the second optical system, and in such a way as to display the item within a fourth image acquired by being captured via the lens unit in a case where the mounted lens unit does not include the first optical system and the second optical system.

5. The electronic equipment according to claim 1, wherein the predetermined processing is performed according to a user operation.

6. The electronic equipment according to claim 1, wherein the predetermined processing is enlargement display processing.

7. The electronic equipment according to claim 1, wherein the program when executed by the processor further causes the electronic equipment to:
acquire optical system information about the first optical system and the second optical system; and
calculate respective center positions and radii of the circular region of the first image and the circular region of the second image based on the optical system information.

8. A method comprising:
acquiring a third image in which a first image captured via a first optical system and a second image captured via a second optical system and having parallax with respect to the first image are arranged side by side;
applying predetermined processing to a target range included in the third image; and
wherein each of the first image and the second image is a circular region, setting a rectangular region circumscribed around a circular region of the first image or a circular region of the second image as a movable region in which the target range included in the third image is movable.

9. The method according to claim 8, further comprising:
performing control in such a way as to display an item indicating the target range on the third image; and
performing control in such a way as to move and display the item within the movable region according to a user operation,
wherein the predetermined processing is applied to a target range included in the third image and corresponding to a position at which the item is displayed.

10. The method according to claim 9, further comprising:
performing control in such a way as to display, on a screen, the first image and the second image side by side in such a manner that the first image is located left and the second image is located right; and
performing control in such a way as not to change a position of the item even if, after a position of the item arrives at a right end of the movable region of the first image, a user operation for further movement in a rightward direction is received, and in such a way as not to change a position of the item even if, after a position of the item arrives at a left end of the movable region of the second image, a user operation for further movement in a leftward direction is received.

11. The method according to claim 8, wherein the predetermined processing is performed according to a user operation.

12. The method according to claim 8, wherein the predetermined processing is enlargement display processing.

13. The method according to claim 8, further comprising:
acquiring optical system information about the first optical system and the second optical system; and
calculating respective center positions and radii of the circular region of the first image and the circular region of the second image based on the optical system information.

14. A non-transitory computer-readable storage medium storing a program which, when executed by a processor, causes the processor to perform a method, the method comprising:
acquiring a third image in which a first image captured via a first optical system and a second image captured via a second optical system and having parallax with respect to the first image are arranged side by side;
applying predetermined processing to a target range included in the third image; and
wherein each of the first image and the second image is a circular region, setting a rectangular region circumscribed around a circular region of the first image or a circular region of the second image as a movable region in which the target range included in the third image is movable.

15. The non-transitory computer-readable storage medium according to claim 14, further comprising:
performing control in such a way as to display an item indicating the target range on the third image; and
performing control in such a way as to move and display the item within the movable region according to a user operation,
wherein the predetermined processing is applied to a target range included in the third image and corresponding to a position at which the item is displayed.

16. The non-transitory computer-readable storage medium according to claim 15, further comprising:
performing control in such a way as to display, on a screen, the first image and the second image side by side in such a manner that the first image is located left and the second image is located right; and
performing control in such a way as not to change a position of the item even if, after a position of the item arrives at a right end of the movable region of the first image, a user operation for further movement in a rightward direction is received, and in such a way as not to change a position of the item even if, after a position of the item arrives at a left end of the movable region of the second image, a user operation for further movement in a leftward direction is received.

17. The non-transitory computer-readable storage medium according to claim 14, wherein the predetermined processing is performed according to a user operation.

18. The non-transitory computer-readable storage medium according to claim 14, wherein the predetermined processing is enlargement display processing.

19. The non-transitory computer-readable storage medium according to claim 14, further comprising:

acquiring optical system information about the first optical system and the second optical system; and calculating respective center positions and radii of the circular region of the first image and the circular region of the second image based on the optical system information.

\* \* \* \* \*